US009906790B2

(12) United States Patent
Kim et al.

(10) Patent No.: US 9,906,790 B2
(45) Date of Patent: Feb. 27, 2018

(54) DEBLOCK FILTERING USING PIXEL DISTANCE

(71) Applicant: QUALCOMM Incorporated, San Diego, CA (US)

(72) Inventors: Woo-Shik Kim, San Diego, CA (US); Jianle Chen, San Diego, CA (US); Joel Sole Rojals, La Jolla, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 14/644,702

(22) Filed: Mar. 11, 2015

(65) Prior Publication Data

US 2015/0264406 A1    Sep. 17, 2015

Related U.S. Application Data

(60) Provisional application No. 61/953,503, filed on Mar. 14, 2014.

(51) Int. Cl.
| | | |
|---|---|---|
| *H04N 7/12* | (2006.01) | |
| *H04N 19/117* | (2014.01) | |
| *H04N 19/182* | (2014.01) | |
| *H04N 19/176* | (2014.01) | |
| *H04N 19/122* | (2014.01) | |
| *H04N 19/86* | (2014.01) | |
| *H04N 19/14* | (2014.01) | |
| *H04N 19/82* | (2014.01) | |

(52) U.S. Cl.
CPC ......... *H04N 19/117* (2014.11); *H04N 19/122* (2014.11); *H04N 19/14* (2014.11); *H04N 19/176* (2014.11); *H04N 19/182* (2014.11); *H04N 19/82* (2014.11); *H04N 19/86* (2014.11)

(58) Field of Classification Search
CPC ...... H04N 19/80; H04N 19/86; H04N 19/176; H04N 19/122; H04N 19/182; H04N 19/117; H04N 19/14; H04N 19/82
USPC ..................................... 375/240.29
See application file for complete search history.

(56) References Cited

U.S. PATENT DOCUMENTS

| | | | |
|---|---|---|---|
| 2009/0322951 A1 | 12/2009 | Mitchell | |
| 2011/0200100 A1* | 8/2011 | Kim | H04N 19/176 375/240.02 |
| 2012/0251012 A1* | 10/2012 | Ikai | H04N 19/44 382/232 |

FOREIGN PATENT DOCUMENTS

| | | |
|---|---|---|
| EP | 2209316 A2 | 7/2010 |
| EP | 2624555 A2 | 8/2013 |

OTHER PUBLICATIONS

International Preliminary Report on Patentability from corresponding PCT Application Serial No. PCT/US2015/020160 dated Jun. 29, 2016 (10 pages).

(Continued)

*Primary Examiner* — Allen Wong
(74) *Attorney, Agent, or Firm* — Shumaker & Sieffert, P.A.

(57) ABSTRACT

The disclosure describes deblock filtering techniques. A video coder may determine an amount by which to deblock filter a pixel value of a pixel based on a geometrical distance from the pixel to a boundary and a pixel value difference between pixel values of at least two pixels. The video coder may then deblock filter the pixel based on the determined amount.

27 Claims, 7 Drawing Sheets

(56) References Cited

OTHER PUBLICATIONS

Wiegand et al., "WD1 : Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.
Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.
Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.
List, et al.,"Adaptive deblocking filter", IEEE Transactions on Circuits and Systems for Video Technology, IEEE Service Center, Piscataway, NJ, US, vol. 13, No. 7, Jul. 2003, pp. 614-619, XP011221094.
Shin, et al., "Variable Block-Based Deblocking Filter for H.264/AVC on Low-end and Low-bit Rates Terminals", Signal Processing: Image Communication, vol. 25, Issue 4, Apr. 2010, pp. 255-267.
Shi, et al., "CE12, Subset 1: Report of Deblocking for Large Size Blocks," JCT Meeting; Joint Collaborative Team on Video Coding (JCT-VC) of ITU-T SG16 WP3 and ISO/IEC JTC1/SC29/WG11, Nov. 21-30, 2011; No. JCTVC-G409, Nov. 8, 2011; 19 pp.
Lu, et al. "CE1: On deblocking filter," JCT Meeting; Joint Collaborative Team on Video Coding (JCT-VC) of ITU-T SG16 WP3 and ISO/IEC JTC1/SC29/WG11, Oct. 10-19, 2012; No. JCTVC-K0149, Oct. 1, 2012, 14 pp.
Lu, et al., "NonCE1: Simple improvements of Deblocking filter," JCT Meeting; Joint Collaborative Team on Video coding (JCT-VC) of ITU-T SG16 WP3 and ISO/IEC JTC1/SC29/WG11, Oct. 10-19, 2012; No. JCTVC-K0150, Oct. 5, 2012; 23 pp.
Kwon, et al., "Non-CE1: Suppression of blocking artifacts at large TU boundaries," JCT Meeting; Joint Collaborative Team on Video Coding (JCT-VC) of ITU-T SG16 WP3 and ISO/IEC JTC1/SC29/WG11, Oct. 10-19, 2012; No. JCTVC-K0269, Oct. 11, 2012; 16 pp.
Flynn, et al., "High Efficiency Video Coding (HEVC) Range Extensions text specification: Draft 6," JCT Meeting; Joint Collaborative Team on Video Coding (JCT-VC) of ITU-T SG16 WP3 and ISO/IEC JTC1/SC29/WG11, Jan. 9-17, 2014; No. JCTVC-P1005_v4, Apr. 3, 2014; 370 pp.
Grange, et al., "A VP9 Bistream Overview," Network Working Group, Feb. 18, 2013, 14 pp.
International Search Report and Written Opinion from International Application No. PCT/US2015/020160, dated Jun. 3, 2015, 12 pp.
Response to Written Opinion dated Jun. 3, 2015, from International Application No. PCT/US2015/020160, filed Jan. 14, 2016, 5 pp.
Second Written Opinion from International Application number from International Application No. PCT/US2015/020160, dated Apr. 4, 2016, 7 pp.
"Joint Call for Proposals for Coding of Screen Content," (Visual Coding group of ITU-T Q6/16 and ISO/IEC/JTC1/SC29/WG11) presented in the Jan. 17, 2014 meeting, San Jose, California. URL: http://www.itu.int/en/ITU-T/studygroups/com16/video/Documents/CfP-HEVC-coding-screen-content.pdf, 15 pp.
Van der Auwera, et al. "Non-CE1: Deblocking of Large Block Artifacts," Oct. 10-19, 2012; ITU-T SG16 WP3 and ISO/IEC JTC1/SC29/WG11, Document JCTVC-K0138, Oct. 2, 2012, 23 pp.

* cited by examiner

| p7$_0$ | p6$_0$ | p5$_0$ | p4$_0$ | p3$_0$ | p2$_0$ | p1$_0$ | p0$_0$ | q0$_0$ | q1$_0$ | q2$_0$ | q3$_0$ | q4$_0$ | q5$_0$ | q6$_0$ | q7$_0$ |
|---|---|---|---|---|---|---|---|---|---|---|---|---|---|---|---|
| p7$_1$ | p6$_1$ | p5$_1$ | p4$_1$ | p3$_1$ | p2$_1$ | p1$_1$ | p0$_1$ | q0$_1$ | q1$_1$ | q2$_1$ | q3$_1$ | q4$_1$ | q5$_1$ | q6$_1$ | q7$_1$ |
| p7$_2$ | p6$_2$ | p5$_2$ | p4$_2$ | p3$_2$ | p2$_2$ | p1$_2$ | p0$_2$ | q0$_2$ | q1$_2$ | q2$_2$ | q3$_2$ | q4$_2$ | q5$_2$ | q6$_2$ | q7$_2$ |
| p7$_3$ | p6$_3$ | p5$_3$ | p4$_3$ | p3$_3$ | p2$_3$ | p1$_3$ | p0$_3$ | q0$_3$ | q1$_3$ | q2$_3$ | q3$_3$ | q4$_3$ | q5$_3$ | q6$_3$ | q7$_3$ |
| p7$_4$ | p6$_4$ | p5$_4$ | p4$_4$ | p3$_4$ | p2$_4$ | p1$_4$ | p0$_4$ | q0$_4$ | q1$_4$ | q2$_4$ | q3$_4$ | q4$_4$ | q5$_4$ | q6$_4$ | q7$_4$ |
| p7$_5$ | p6$_5$ | p5$_5$ | p4$_5$ | p3$_5$ | p2$_5$ | p1$_5$ | p0$_5$ | q0$_5$ | q1$_5$ | q2$_5$ | q3$_5$ | q4$_5$ | q5$_5$ | q6$_5$ | q7$_5$ |
| p7$_6$ | p6$_6$ | p5$_6$ | p4$_6$ | p3$_6$ | p2$_6$ | p1$_6$ | p0$_6$ | q0$_6$ | q1$_6$ | q2$_6$ | q3$_6$ | q4$_6$ | q5$_6$ | q6$_6$ | q7$_6$ |
| p7$_7$ | p6$_7$ | p5$_7$ | p4$_7$ | p3$_7$ | p2$_7$ | p1$_7$ | p0$_7$ | q0$_7$ | q1$_7$ | q2$_7$ | q3$_7$ | q4$_7$ | q5$_7$ | q6$_7$ | q7$_7$ |

FIG. 6

DEBLOCK FILTERING USING PIXEL DISTANCE

This application claims the benefit of U.S. Provisional Application No. 61/953,503, filed Mar. 14, 2014, the entire content of which is hereby incorporated by reference in its entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

The disclosure describes example techniques for deblock filtering reconstructed blocks of a picture. A video coder (e.g., video encoder or video decoder) determines an amount by which to deblock filter a pixel value of a pixel of a block based on a distance of the pixel to a boundary of the block, and based on a pixel value difference between pixel values of pixels. In some examples, the video coder may also utilize the number of pixels that are to be deblock filtered for determining the amount by which to deblock filter the pixel value of the pixel.

In one example, the disclosure describes a method of processing video data, the method comprising determining a geometrical distance from a first pixel of a first block to a boundary between the first block and a second block, determining a pixel value difference based on a pixel value of a second pixel and a pixel value of a third pixel, determining an amount by which to deblock filter a pixel value of the first pixel based on the geometrical distance and the pixel value difference, and deblock filtering the pixel value of the first pixel based on the amount by which to deblock filter.

In one example, the disclosure describes a device for processing video data, the device comprising a video data memory storing pixel values, and a video coder configured to determine a geometrical distance from a first pixel of a first block to a boundary between the first block and a second block, wherein pixel values of the second block are stored in the video data memory, determine a pixel value difference based on a pixel value of a second pixel and a pixel value of a third pixel, determine an amount by which to deblock filter a pixel value of the first pixel based on the geometrical distance and the pixel value difference, and deblock filter the pixel value of the first pixel based on the amount by which to deblock filter.

In one example, the disclosure describes a device for processing video data, the device comprising means for determining a geometrical distance from a first pixel of a first block to a boundary between the first block and a second block, means for determining a pixel value difference based on a pixel value of a second pixel and a pixel value of a third pixel, means for determining an amount by which to deblock filter a pixel value of the first pixel based on the geometrical distance and the pixel value difference, and means for deblock filtering the pixel value of the first pixel based on the amount by which to deblock filter.

In one example, the disclosure describes a computer-readable storage medium having instructions stored thereon that when executed cause one or more processors to determine a geometrical distance from a first pixel of a first block to a boundary between the first block and a second block, determine a pixel value difference based on a pixel value of a second pixel and a pixel value of a third pixel, determine an amount by which to deblock filter a pixel value of the first pixel based on the geometrical distance and the pixel value difference, and deblock filter the pixel value of the first pixel based on the amount by which to deblock filter.

The details of one or more examples are set forth in the accompanying drawings and the description below. Other features, objects, and advantages will be apparent from the description and drawings, and from the claims.

BRIEF DESCRIPTION OF DRAWINGS

FIG. 6 is a conceptual diagram illustrating pixel positions near an edge of a video block between sub-blocks.

DETAILED DESCRIPTION

Figure 1:
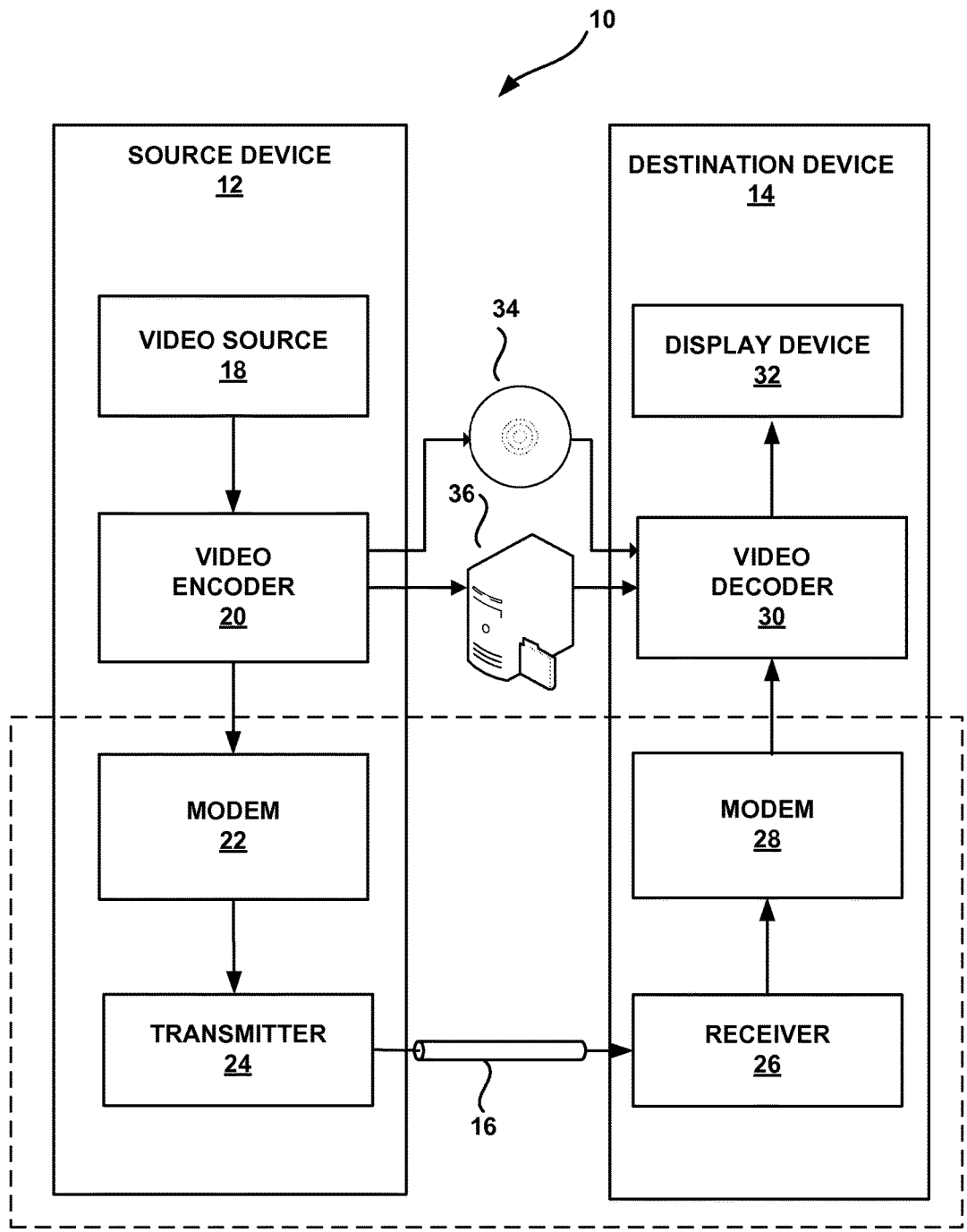
FIG. 1 is a block diagram illustrating an example video encoding and decoding system that may utilize the techniques described in this disclosure.

This disclosure relates to the field of video coding and compression. As one example, the disclosure is related to the high efficiency video coding (HEVC) standard and its Range Extension and Screen Content Coding extension. However, the techniques should not be considered limited to the HEVC standard or its Range Extension and Screen Content Coding extension. For ease of description, the techniques are described with respect to the HEVC standard, but the techniques may be applicable to other video coding standards, and are applicable generally to video coding techniques. Also, the techniques described in this disclosure may become part of standards developed in the future. In other words, the techniques described in this disclosure may be applicable to previously developed video coding standards, video coding standards currently under development, and forthcoming video coding standards.

As part of video coding, a video encoder reconstructs an encoded video block and stores the reconstructed video block in a decoded picture buffer (DPB) of the video encoder so that the reconstructed video block can be used for inter-prediction or intra-prediction of a subsequent block. A video decoder receives video data for an encoded video block, and reconstructs the video block for eventual display.

In some cases, there may be blocking artifacts along a boundary of a block. Such blocking artifacts may be particularly noticeable to a viewer when the block size of the block used for reconstruction is relatively large. A blocking artifact generally refers to disruptions at boundaries of a block that causes the viewer to perceive distinct video blocks in the video content, rather than blended transition from one block to another, so that the viewer cannot perceive a transition from one block to another. More generally, blocking artifacts may be a result of block-based video coding that cause perceivable disruption in video content from one block to another.

As described in this disclosure, to smooth the blocking artifact, a video coder (e.g., a video encoder or a video decoder) may apply a deblocking filter on a plurality of pixels proximate to the block boundary (e.g., N pixels extending from the boundary of the block). Smoothing of the blocking artifact averages out sudden jumps in the pixel values between pixels on opposite sides of the boundary between neighboring blocks so that the change in pixel values from one side of the block is a smooth transition across the block boundary, rather than a sudden jump between pixel values. In other words, smoothing the blocking artifact results in a reduction in the amount by which pixel values proximate to a boundary change such that there is a smooth transition in the pixel values.

The disclosure describes examples of determining an amount by which to deblock filter a pixel value of a pixel in a block based on a geometrical distance of the pixel to a boundary of the block and a difference in pixel values (i.e., a pixel value difference). The pixel value of a pixel in a block may be the luma value of a pixel in a luma block, or one of the chroma values of a pixel in one of the chroma blocks. In some examples, a video coder may also utilize a number of pixels that are to be deblock filtered for determining the amount by which to deblock filter a pixel value of a pixel.

In some cases, the blocking artifact along the block boundary may be significant for relatively large block sizes (e.g., 32×32 as one example). For example, a video coder determines a transform unit as part of coding a block. If the block size of the transform unit is relatively large, the blocking artifacts may be significant. Current techniques, such as those in the HEVC video coding standard and other proposals, exist to smooth blocking artifacts; however, such techniques may not adequately smooth the blocking artifacts for large block sizes or greatly increase computational and implementation complexity to achieve adequate smoothing of the blocking artifacts.

The techniques described in this disclosure may improve visual quality by smoothing blocking artifact based on geometrical distance and pixel value difference. For example, the techniques may preserve the pixel value before filtering according to the pixel distance, where the pixel distance is a function of the geometrical distance and the pixel value difference. The video coder may also be able to perform the deblock filtering using fewer number of pixels, as some other techniques, which facilitates processing and implementation.

FIG. 1 is a block diagram illustrating an example video encoding and decoding system 10 that may be configured to utilize techniques in accordance with examples of this disclosure. As shown in FIG. 1, system 10 includes source device 12 that transmits encoded video to destination device 14 via communication channel 16. Encoded video data may also be stored on storage medium 34 or file server 36 and may be accessed by destination device 14 as desired. When stored to a storage medium or file server, video encoder 20 may provide coded video data to another device, such as a network interface, a compact disc (CD), Blu-ray or digital video disc (DVD) burner or stamping facility device, or other devices, for storing the coded video data to the storage medium. Likewise, a device separate from video decoder 30, such as a network interface, CD or DVD reader, or the like, may retrieve coded video data from a storage medium and provided the retrieved data to video decoder 30.

Source device 12 and destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, a wireless handset device, or the like. In many cases, such devices may be equipped for wireless communication. Hence, communication channel 16 may comprise a wireless channel, a wired channel, or a combination of wireless and wired channels suitable for transmission of encoded video data. Similarly, file server 36 may be accessed by destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In some examples, the techniques described in this disclosure may be particularly useful in video coding according to the high efficiency video coding (HEVC) standard. However, the techniques described in this disclosure should not be considered limited to any particular video coding standard. The techniques described in this disclosure may be applicable to non-standards based video coding as well.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010.

In addition, there is a new developed video coding standard, namely High Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG). A recent draft of HEVC, referred to as "HEVC Working Draft 10" or "WD10," described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan., 2013, is available from: http://phenix.int-evry.fr/jct/doc_end user/documents/12_Geneva/wg11/JCTVC-L1003-v34.zip.

HEVC is the international standard for video coding recently developed by the Joint Collaborative Team on Video Coding (JCT-VC) of ITU-T WP3/16 and ISO/IEC JTC1/SC29/WD11. The Range Extension of HEVC includes extending video coding for color spaces other than YCbCr 4:2:0, such as YCbCr 4:2:2, YCbCr 4:4:4, and RGB. The Range Extension draft is: D. Flynn, M. Naccari, C. Rosewarne, J. Sole, G. Sullivan, and T. Suzuki, "High Efficiency Video Coding (HEVC) Range Extensions text specification: Draft 3," ITU-T SG16 WP3 and ISO/IEC JTC1/SC29/WG11, Document JCTVC-P1005, January 2014. In addition, a new standardization activity has been made to improve coding performance for Screen Content Coding. The activity for the new standardization is: Joint Call for Proposals for Coding of Screen Content, ITU-T Q6/16 and ISO/IEC JTC1/SC29/WG11, Document MPEG2014/N14175, January 2013.

In the example of FIG. 1, source device 12 includes video source 18, video encoder 20, modulator/demodulator (modem) 22 and transmitter 24. In source device 12, video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones, which may be provided, e.g., within smartphones or tablet computers. However, the techniques described in this disclosure may be applicable to video coding in general, and may be applied to wireless and/or wired applications, or application in which encoded video data is stored on a local disk.

The captured, pre-captured, or computer-generated video may be encoded by video encoder 20. The encoded video information may be modulated by modem 22 according to a communication standard, such as a wired or wireless communication protocol, and transmitted to destination device 14 via transmitter 24. Modem 22 may include various mixers, filters, amplifiers or other components designed for signal modulation. Transmitter 24 may include circuits designed for transmitting data, including amplifiers, filters, and, in the case of wireless communication, one or more antennas.

The captured, pre-captured, or computer-generated video that is encoded by video encoder 20 may also be stored onto storage medium 34 or file server 36 for later consumption. Storage medium 34 may include Blu-ray discs, DVDs, CD-ROMs, flash memory, or any other suitable digital storage media for storing encoded video. The encoded video stored on the storage medium 34 may then be accessed by destination device 14 for decoding and playback. Although not shown in FIG. 1, in some examples, storage medium 34 and/or file server 36 may store the output of transmitter 24.

Also, while storage medium 34 and file server 36 are illustrated as receiving video data from video encoder 20, in some examples, storage medium 34 and file server 36 may receive video data from transmitter 24 or some other unit, rather than video encoder 20. Similarly, while storage medium 34 and file server 36 are illustrated as outputting video data to video decoder 30, in some examples, storage medium 34 and file server 36 may output video data to receiver 26 or some other unit, rather than video decoder 30. In these examples, video decoder 30 may receive video data from receiver 26 or some other unit.

File server 36 may be any type of server capable of storing encoded video and transmitting that encoded video to destination device 14. Example file servers include a web server (e.g., for a website), an FTP server, network attached storage (NAS) devices, a local disk drive, or any other type of device capable of storing encoded video data and transmitting it to a destination device. The transmission of encoded video data from file server 36 may be a streaming transmission, a download transmission, or a combination of both. File server 36 may be accessed by destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

Destination device 14, in the example of FIG. 1, includes receiver 26, modem 28, video decoder 30, and display device 32. Receiver 26 of destination device 14 receives information over communication channel 16, and modem 28 demodulates the information to produce a demodulated bitstream for video decoder 30. The information communicated over communication channel 16 may include a variety of syntax information generated by video encoder 20 for use by video decoder 30 in decoding video data. Such syntax may also be included with the encoded video data stored on storage medium 34 or file server 36. Each of video encoder 20 and video decoder 30 may form part of a respective encoder-decoder (CODEC) that is capable of encoding or decoding video data.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as HEVC and/or extensions of the HEVC standard. HEVC range extensions are presently under development. Furthermore, the description of HEVC and its extensions is provided for purposes of illustration, and should not be considered limiting. In general, video encoder 20 and video decoder 30 may be configured to perform the example techniques described in this disclosure, related to video coding, and more particularly to deblock filtering, as described in more detail.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to a multiplexer protocol. Examples include the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Examples of a device that includes video decoder 30 include a wireless communication device, an integrated circuit (IC), and a microprocessor. Similarly, examples of a device that includes video encoder 20 include a wireless communication device, an IC, and a microprocessor.

In some examples, video encoder 20 and video decoder 30 may each include one or more processors that are configured to implement the techniques described in this disclosure. The device that includes video encoder 20 or video decoder 30 may also include memory that stores video data that video encoder 20 and video decoder 30 utilize. In examples where the device that includes video encoder 20 and video decoder 30 is an IC chip or a microprocessor, the memory may be local memory of the IC chip or microprocessor, or may be the system memory of the apparatus (e.g., the wireless communication device such as a smart-phone or tablet) that includes the IC chip or microprocessor, or a combination of the local and system memory. In examples where the device that includes video encoder 20 and video decoder 30 is a wireless communication device (or other such device), the memory may be the local memory of video encoder 20 or video decoder 30, the system memory of the device that includes video encoder 20 or video decoder 30, or a combination of the local and system memory.

In accordance with this disclosure, video encoder 20 may implement any or all of the techniques of this disclosure for deblock filtering. Likewise, video decoder 30 may implement any or all of these techniques for deblock filtering. A video coder, as described in this disclosure, may refer to a video encoder or a video decoder. Similarly, a video coding unit may refer to a video encoder or a video decoder. Likewise, video coding may refer to video encoding or video decoding. For instance, because video encoder 20 and video decoder 30 may each perform the example techniques described in this disclosure, the term "video coder" is used to generically represent a video encoder or a video decoder. In portions of this disclosure where specific encoding techniques are called out, the video coder represents an example of video encoder 20, and in portions of this disclosure where specific decoding techniques are called out, the video coder represents an example of video decoder 30. The term "code" or "coding" are also used to generically refer to encode/decode or encoding/decoding, respectively.

Digital video devices implement video compression techniques to encode and decode digital video information more efficiently. Video compression may apply spatial (intra-frame) prediction and/or temporal (inter-frame) prediction techniques to reduce or remove redundancy inherent in video sequences.

An HEVC-compliant video decoding device supports several additional capabilities relative to previous generation devices (e.g., ITU-T H.264/AVC devices). For example, whereas H.264 provides nine intra-prediction encoding modes, HEVC supports as many thirty-five intra-prediction encoding modes. The following section will discuss certain aspects of HEVC in more detail.

For video coding according to the HEVC standard, a video frame may be partitioned into coding units. A coding unit (CU) generally refers to an image region that serves as a basic unit to which various coding tools are applied for video compression. A CU usually has a luminance component, denoted as Y, and two chroma components, denoted as U and V. Depending on the video sampling format, the size of the U and V components, in terms of number of samples, may be the same as or different from the size of the Y component.

A CU is typically square, and may be considered to be similar to a so-called macroblock, e.g., under other video coding standards such as ITU-T H.264. Coding according to some of the presently proposed aspects of the HEVC standard will be described in this application for purposes of illustration. However, the techniques described in this disclosure may be useful for other video coding processes, such as processes defined according to range extensions of HEVC, H.264 or other standard or proprietary video coding processes.

According to HEVC, a CU may include one or more prediction units (PUs) and/or one or more transform units (TUs). Syntax data within a bitstream may define a largest coding unit (LCU), which is a largest CU in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block" or "portion" to refer to any of a CU, PU, or TU. In general, "portion" may refer to any sub-set of a video frame.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, 4 sub-CUs of a leaf-CU will also be referred to as leaf-CUs although there is no explicit splitting of the original leaf-CU. For example if a CU at 16×16 size is not split further, the four 8×8 sub-CUs will also be referred to as leaf-CUs although the 16×16 CU was never split.

A leaf-CU may include one or more PUs. In general, a PU represents all or a portion of the corresponding CU, and may include data for retrieving a reference sample for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the leaf-CU defining the PU(s) may also describe, for example, partitioning of the CU into one or more PUs. Partitioning modes may differ depending on whether the CU is uncoded, intra-prediction mode encoded, or inter-prediction mode encoded. For intra coding, a PU may be treated the same as a leaf transform unit described below.

The HEVC standard allows for transformations according to transform units (TUs), which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized. A TU includes a luma transform block and two chroma transform blocks. As such, any coding process discussed below that is applied to a TU, may be, in actuality, applied to the luma and chroma transform blocks.

In general, a PU refers to data related to the prediction process. For example, when the PU is intra-mode encoded, the PU may include data describing an intra-prediction mode for the PU. As another example, when the PU is inter-mode encoded, the PU may include data defining a motion vector for the PU.

In general, a TU is used for the transform and quantization processes. A given CU having one or more PUs may also include one or more TUs. Following prediction, video encoder 20 may calculate residual values from the video block identified by the coding node in accordance with the PU. The coding node is then updated to reference the residual values rather than the original video block. The residual values comprise pixel difference values that may be transformed into transform coefficients, quantized, and scanned using the transforms and other transform information specified in the TUs to produce serialized transform coefficients for entropy coding. The coding node may once again be updated to refer to these serialized transform coefficients. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

To code a block (e.g., a prediction unit of video data), a predictor for the block is first derived. The predictor, also referred to as a predictive block, can be derived either through intra (I) prediction (i.e., spatial prediction) or inter (P or B) prediction (i.e. temporal prediction). Hence, some prediction units may be intra-coded (I) using spatial prediction with respect to reference samples in neighboring reference blocks in the same frame (or slice), and other prediction units may be uni-directionally inter-coded (P) or bi-directionally inter-coded (B) with respect to blocks of reference samples in other previously-coded frames (or slices). In each case, the reference samples may be used to form a predictive block for a block to be coded.

Upon identification of a predictive block, the difference between the pixels in the original video data block and the pixels in its predictive block is determined. This difference may be referred to as the prediction residual data, and indicates the pixel differences between the pixel values in the block to the coded and the pixel values in the predictive block selected to represent the coded block. To achieve better compression, the prediction residual data may be transformed, e.g., using a discrete cosine transform (DCT), an integer transform, a Karhunen-Loeve (K-L) transform, or another transform to produce transform coefficients.

The residual data in a transform block, such as a TU, may be arranged in a two-dimensional (2D) array of pixel difference values residing in the spatial, pixel domain. A transform converts the residual pixel values into a two-dimensional array of transform coefficients in a transform domain, such as a frequency domain.

For further compression, the transform coefficients may be quantized prior to entropy coding. An entropy coder then applies entropy coding, such as Context Adaptive Variable Length Coding (CAVLC), Context Adaptive Binary Arithmetic Coding (CABAC), Probability Interval Partitioning Entropy Coding (PIPE), or the like, to the quantized transform coefficients. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, Video encoder 20 may also entropy encode syntax elements associated with the encoded video data for use by video decoder 30 in decoding the video data.

Arithmetic coding is a form of entropy coding used in many compression algorithms that have high coding efficiency, because it is capable of mapping symbols to non-integer length codewords. CABAC coding may be applied to some information and bypassed for other information.

Video decoder 30 performs the inverse of the process of video encoder 20 to decode a block. For example, video decoder 30 determines a TU from the coefficient data received from the bitstream and identifies a predictor from motion vector information or intra-coding mode information from the bitstream. Video decoder 30 then adds the predictor to the TU to generate a block.

As described above, video encoder 20 and video decoder 30 may be configured to implement the example deblock filtering techniques described in this disclosure. For instance, a video coder (e.g., video encoder 20 or video decoder 30) may perform deblock filtering to remove blocking artifact along block boundaries. Blocking artifacts refers to video content imperfections in which a viewer can see boundaries of the video blocks. Deblock filtering smoothes pixel values of pixels proximate to the boundary so that the viewer does not perceive the video blocks (i.e., there is no abrupt change in video content from one block to another).

However, deblock filtering should not over-smooth video content as well, as such over-smoothing degrades visual quality. Furthermore, in certain cases, the video content itself may include abrupt changes, and deblock filtering should not overly smooth such changes. For instance, for real image edges (e.g., an edge formed with a black foreground object on a white background, as an illustrative example), the deblock filtering should not smooth over such real image edges.

Currently, the HEVC standard uses large block size transform (e.g., relatively large TU sizes), which can cause significant blocking artifact along the block boundaries. HEVC includes the in-loop deblock filtering scheme, which has a strong filtering method. However, it has been noticed that there is inefficiency to handle severe blocking artifact when the block size is large.

To resolve this issue, many proposals have been made to HEVC. In Z. Shi, X. Sun, and J. Xu, "CE12, Subset 1: Report of deblocking for large size blocks," ITU-T SG16 WP3 and ISO/IEC JTC1/SC29/WG11, Document JCTVC-G409, November 2011, longer filter was proposed to make the boundary of larger transform block smooth. In G. Van der Auwera, R. Joshi, and M. Karczewicz, "Non-CE1: Deblocking of Large Block Artifacts," ITU-T SG16 WP3 and ISO/IEC JTC1/SC29/WG11, Document JCTVC-K138, October 2012, S. Lu, O. Nakagami, and T. Suzuki, "CE1: On deblocking filter," ITU-T SG16 WP3 and ISO/IEC JTC1/SC29/WG11, Document JCTVC-K149, October 2012, S. Lu, O. Nakagami, and T. Suzuki, "NonCE1: Simple improvement of Deblocking filter," ITU-T SG16 WP3 and ISO/IEC JTC1/SC29/WG11, Document JCTVC-K150, October 2012, and D.-K. Kwon and M. Budagavi, "Non-CE1: Suppression of blocking artifacts at large TU boundaries," ITU-T SG16 WP3 and ISO/IEC JTC1/SC29/WG11, Document JCTVC-K269, October 2012, deblock filtering parameters are adjusted for large transform block (e.g., TU) size. These techniques could help attenuate the blocking artifact along the boundaries of larger transform blocks. However, no change was made in HEVC.

In Google VP9, A. Grange and H. Alvestrand, "A VP9 Bitstream Overview," Network Working Group, IETF, February 2013, a long filter is used to reduce the blocking artifact, which is similar to "CE12, Subset 1: Report of deblocking for larger size blocks." Both "CE12, Subset 1: Report of deblocking for larger size blocks" and "Non-CE1: Suppression of blocking artifacts at large TU boundaries" can reduce the blocking artifact along the boundaries of large transform blocks. However, these techniques require accessing many pixels along a block boundaries, which increases computational and implementation complexity. Also the filters in them are very strong low pass filters, which can perform over-smoothing leading to visual quality degradation. On the other hand, the performance by modifying deblock filter parameters as proposed in "Non-CE1: Deblocking of Large Block Artifacts," "CE1: On deblocking filter," "NonCE1: Simple improvement of Deblocking filter," and "Non-CE1: Suppression of blocking artifacts at large TU boundaries" can be limited as the number of pixels modified along the boundaries are not enough, and in some cases these methods can cause smoothing of real image edges, which degrades visual quality.

The example techniques described in this disclosure may overcome one or more of the issues described above for deblock filtering. For example, this disclosure describes a new filter design to reduce blocking artifact. The techniques described in this disclosure improve visual quality by preserving the pixel value before filtering according to a pixel distance (e.g., a defined pixel distance). It also requires less number of pixels for the filtering compared to at least some, if not all of the other techniques described above, such as those described in "CE12, Subset 1: Report of deblocking for large size blocks" and "Non-CE1: Suppression of blocking artifacts at large TU boundaries," which facilitates processing and implementation.

In some examples, video encoder 20 may perform the deblock filtering as part of the reconstruction of a block that is being encoded. For instance, as described above, video encoder 20 determines a TU, which includes the residual data. The TU is then transformed and quantized. Additionally, video encoder 20 inverse-quantizes and inverse-transforms the block to reconstruct the TU. Video encoder 20 adds the predictor to the reconstructed TU to generate a reconstructed block. In the techniques described in this disclosure, video encoder 20 may deblock filter the reconstructed block, utilizing the techniques described in this disclosure, to generate a filtered reconstructed block that video encoder 20 stores in a decoded picture buffer (DPB) so that the block can be used for inter- or intra-prediction encoding of a subsequent block.

Video decoder 30 may perform the deblock filtering as part of generating the block. For instance, video decoder 30 receives the coefficients of the block, inverse-quantizes and inverse-transforms the block to reconstruct the TU. Video decoder 30 adds the predictor to the reconstructed TU to generate a reconstructed block. Video decoder 30 may deblock filter the reconstructed block, utilizing the techniques described in this disclosure, to generate a filtered reconstructed block that video decoder 30 stores in its DPB so that the block can be used for inter- or intra-prediction decoding of a subsequent block, and for output of the decoded video for display.

In the techniques described in this disclosure, a video coder (e.g., video encoder 20 or video decoder 30) may determine a geometrical distance from a first pixel of a first block to a boundary between the first block and a second block. The video coder may determine a pixel value difference based on a pixel value of a second pixel and a pixel value of a third pixel. The video coder may determine an amount by which to deblock filter the pixel value of the first pixel based on the geometrical distance and the pixel value difference, and deblock filter the pixel value of the first pixel based on the amount by which to deblock filter. Examples of deblock filtering techniques are provided with the example illustrated in FIG. 4.

Figure 4:
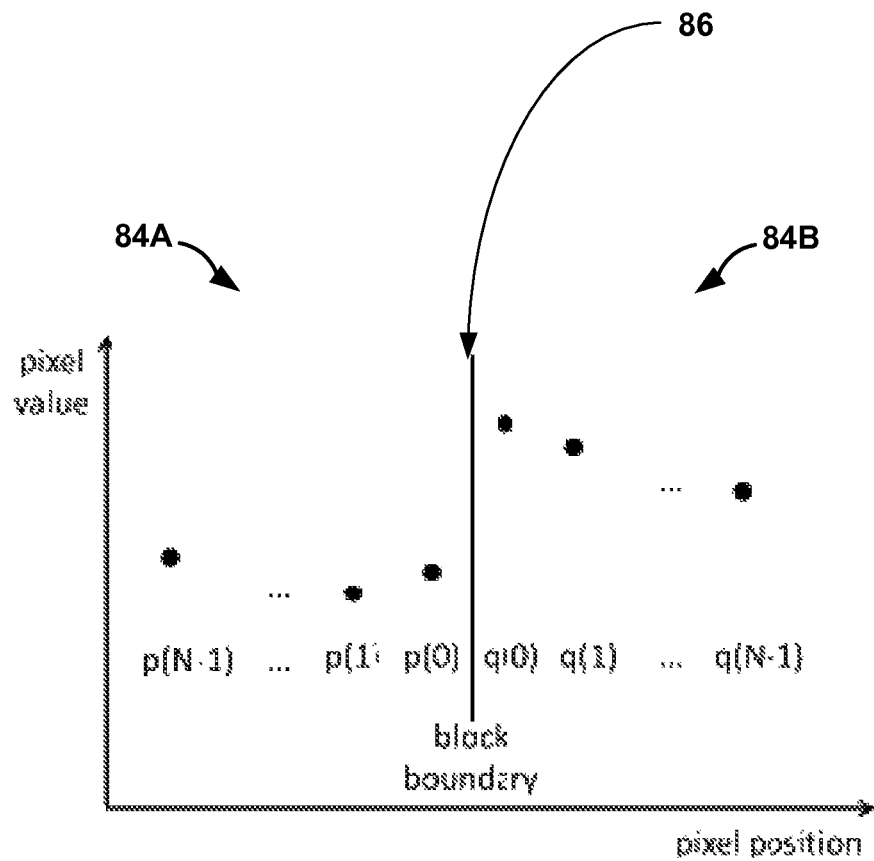
FIG. 4 is a conceptual diagram illustrating an example of pixel values relative to pixel positions across a block boundary.

FIG. 4 is a conceptual diagram illustrating an example of pixel values relative to pixel positions across a block boundary. For instance, FIG. 4 illustrates block 84A and block 84B. FIG. 4 illustrates an example where "l" is the block boundary 86 between block 84A and block 84B. Block boundary 86 may be a boundary between two neighboring TUs, but may be a boundary between two neighboring PUs, in some examples. In the example, where boundary 86 is a boundary between two TUs, block 84A and block 84B may both be TUs. In the example, where boundary 86 is a boundary between two PUs, block 84A and block 84B may both be PUs.

Boundary 86 can be either a horizontal block boundary or a vertical block boundary. For purposes of example, boundary 86 is illustrated as a vertical block boundary. The example techniques, however, are equally applicable to cases where the boundary is horizontal.

Block 84B may be a current block that is being coded (e.g., encoded or decoded), and block 84A may be previously coded block. For example, block 84A may be stored in the DPB of the video coder. In this example, block 84B may be the reconstructed block (e.g., a reconstructed TU plus predictor) before deblock filtering.

Also, in this example, part of block 84A may have already been deblock filtered, but the right-end boundary of block 84A may not yet have been deblock filtered (e.g., pixels p(0) to p(N-1)). For instance, the video coder may have deblock filtered the pixels proximate to the left-end boundary of block 84A with pixels proximate to a right-end boundary of a block that neighbors block 84A on the left side. The video coder may have stored the resulting block as block 84A in the video coder's DPB, and now retrieved block 84A to deblock block filter pixels proximate to the left-end boundary of block 84B (e.g., pixels q(0) to q(N-1)). Similarly, when the video coder is coding the block to the right of block 84B, the video coder would deblock filter the pixels proximate to the right-end boundary of block 84B. The video coder may perform similar deblock filtering based on blocks above and below block 84B (e.g., for the case where the boundary is a horizontal boundary). In some examples, as part of the deblocking, the video coder may deblock filter pixels p(0) to p(N-1) of block 84A, where some portion of the block 84A was already deblock filtered, and deblock filter pixels q(0) to q(N-1) of block 84B, where block 84B is the current block being encoded or decoded.

In FIG. 4, the pixels of block 84A are pixels 0 to N-1, with pixel values p(0) to p(N-1), respectively, and the pixels of block 84B are pixels 0 to N-1, with pixel values q(0) to q(N-1), respectively. The pixel value of a pixel in a block may be the luma value of a pixel in a luma block, or one of the chroma values of a pixel in one of the chroma blocks. For example, p(0) to p(N-1) may correspond to luma values of a pixel in examples where block 84A is a luma block, or one of the chroma values of a pixel in examples where block 84A is one of the chroma blocks. Similarly, q(0) to q(N-1) may correspond to luma values of a pixel in examples where block 84B is a luma block, or one of the chroma values of a pixel in examples where block 84B is one of the chroma blocks.

Pixels with pixel values p(0) to p(N-1) may be in the same row, and pixels with pixel values q(0) to q(N-1) may be in the same row, and the same row as pixels with pixel values p(0) to p(N-1). The variable "N" indicates the number of pixels that are to be deblock filtered (i.e., N-1 pixels in block 84A and N-1 pixels in block 84B).

As illustrated in FIG. 4, pixels with pixel values p(0) to p(N-1) are all proximate to boundary 86, and progressively move away from boundary 86. For example, the pixel with pixel value p(0) of block 84A is closest to boundary 86, the pixel with pixel value p(1) of block 84A is the next closest, and the pixel with pixel value p(N-1) of block 84A is furthest away from boundary 86. Likewise, pixels with pixel values q(0) to q(N-1) are all proximate to boundary 86, and progressively move away from boundary 86. For example, the pixel with pixel value q(0) of block 84B is closest to boundary 86, the pixel with pixel value q(1) of block 84B is the next closest, and the pixel with pixel value q(N-1) of block 84B is furthest away from boundary 86. Also, the pixel with pixel value p(0) and the pixel with pixel value q(0) may be equidistant to boundary 86, the pixel with pixel value p(1) and the pixel with pixel value q(1) may be equidistance to boundary 86, and so forth.

More generally, the distance between the pixel with pixel value p(i) to boundary 86 equals the distance between the pixel with pixel value q(i) to boundary 86. In other words, let p(i) and q(i) denote the pixel values at position i at each side against block boundary 86, where i is 0 for the nearest pixel from boundary 86 and increases as the position moves away from boundary 86.

As illustrated in FIG. 4, there is an abrupt change between pixel value p(0) and q(0), which are the pixel values for the closest pixels in block 84A and block 84B, respectively. The abrupt change between the pixel values p(0) and q(0) may cause block artifacts between block 84A and block 84B. Such block artifacts cause reduction in visual quality of the video content. The deblock filtering techniques described in this disclosure may reduce such block artifacts in a computational efficient manner without performing over smoothing that degrades visual quality.

In general, a video coder determines an amount by which to deblock filter pixel values of a pixel based on a pixel value difference between at least two pixels and a geometrical distance. In this disclosure, the term "pixel distance" is defined as the amount by which to deblock filter pixel values of a pixel, and is a function of a pixel value difference and the geometrical distance.

For example, the pixel distance 1 (e.g., a value used to determine an amount by which to deblock filter) is defined as $l(i)=f(n(i), d(i))$, where n denotes geometrical distance between the pixel to be modified (e.g., deblock filtered) and the location of the block boundary (e.g., boundary 86), and d denotes the pixel value distance (e.g., difference) between the pixel values against block boundary 86. In some examples, the value of 1(i) equals the amount by which to deblock filter a pixel value of a pixel. In some examples, the value of 1(i) may be further modified to determine the amount by which to deblock filter a pixel value of a pixel.

In some examples, the video coder may determine the geometrical distance of a pixel based on a number of pixels between the pixel and boundary 86. As one examples, the geometrical distance, n, can be set according to the number of pixels between the pixel to be modified (e.g., deblock filtered) and the block boundary 86. For example, n is 0 for p(0) and q(0), and n is 1 for p(1) and q(1), and so on. This implies the equation: n(i)=i, i=0 . . . N−1, where i is pixel index.

In the above example, the distance between p(0) and q(0) is ignored (i.e., is set to 0). The geometrical distance, n, can be set considering the distance between p(0) and q(0) (i.e., in examples where the distance from the pixel with pixel value p(0) and the pixel with pixel value q(0) and boundary 86 is not zero). For example, n is set to 0.5 for p(0) and q(0). Then, n is 1.5 for p(1) and q(1), and 2.5 for p(2) and q(2), and so on. Accordingly, even in this example, the geometrical distance of a pixel is based on a number of pixels between the pixel and boundary 86. This implies the equation: n(i)=(2×i+1)/2.

The above describes example ways in which to determine a geometrical distance of a pixel that is to be deblock filtered to boundary 86. There may be other ways in which to determine the geometrical distance of a pixel to boundary 86. For instance, the pixels with pixel values p(0) and q(0) being 0 units or 0.5 units away from boundary 86 is provided for purposes of illustration. The distance between the pixels with pixel values p(0) and q(0) and boundary 86 may be different than 0 or 0.5.

The following describes example ways to determine pixel value difference. In some examples, the pixel value difference may be between the pixel to be deblock filtered and another pixel. However, the techniques are not so limited. In some examples, the pixel value difference may be between two pixels, neither one of which is the pixel to be deblock filtered.

The video coder calculates the pixel value difference between two pixel values, p(i) and q(j), by subtracting one from the other as q(j)−p(i). The pixel value distance, d, can be calculated by considering the pixel value difference between all or part of the pixels, p(N−1) p(N−2) . . . p(1) p(0) and q(0) q(1) . . . q(N−2) q(N−1).

As one example, d at position i, d(i) can be set as: d(i)=q(0)−p(0), or d(i)=(q(0)−p(0))/2. In this case, d(i) is the same for all pixel positions. For example, the video coder may determine a pixel value difference based on a pixel value of a pixel of block 84A that is closest to boundary 86 (e.g., p(0)), and a pixel value of a pixel of block 84B that is closest to boundary 86 (e.g., q(0)).

In this example, the video coder determines a pixel value difference, but the pixel value difference may not be based on the pixel to be deblock filtered. For instance, assume the pixel with pixel value p(1) (i.e., the pixel after the pixel closest to boundary 86) is to be deblock filtered. In this example, the pixel value difference for the pixel with pixel value p(1) is based on the pixel value difference of q(0) and p(0). In this example, the video coder determines pixel value differences between two pixels, where neither of the pixel values necessarily is for the pixel being filtered, and divides the result by two to determine a pixel value difference used for determining an amount by which to deblock filter a pixel value.

Also, in this example, for the pixel value difference, one of the pixels is from block 84A (pixel with pixel value p(0)), and the other pixel is from block 84B (pixel with pixel value q(0)). Moreover, in this example, although the video coder may not use the pixel to be filtered for determining the pixel value difference, the video coder may use pixel to be filtered for determining the geometrical distance (e.g., using one of the equations for n(i) described above).

As another example, d can be changed according to the pixel location. For example d(i) can be set for each pixel at position i as d(i)=q(i)−p(i) or d(i)=((q(i)−p(i))/2. For example, the video coder may determine a pixel value difference based on a pixel value of a pixel in block 84A and a pixel value of a pixel in block 84B, where the pixels in respective blocks 84A and 84B are the same distance to boundary 86. In other words, the pixel with pixel value p(i) in block 84A is equidistant to boundary 86 as the pixel with pixel value q(i) in block 84B.

In this example, the video coder determines a pixel value difference, and the pixel value difference is based on the pixel to be deblock filtered. For instance, assume the pixel with pixel value p(1) (i.e., the pixel after the pixel closest to boundary 86) is to be deblock filtered. In this example, the pixel value difference for the pixel with pixel value p(1) is based on the pixel value difference of q(1) and p(1). In this example, the video coder determines pixel value differences between two pixels, where one of the pixel values is for the pixel being filtered, and divides the result by two to determine a pixel value difference used for determining an amount by which to deblock filter a pixel value.

As above, in this example, for the pixel value difference, one of the pixels is from block 84A (pixel with pixel value p(i)), and the other pixel is from block 84B (pixel with pixel value q(i)), but at least one of the pixels used for determining the pixel value difference is a pixel that is to be deblock filtered (e.g., the pixel with pixel value p(i) and the pixel with pixel value q(i) are to be deblock filtered). Also, the geometrical distance is determined based on the distance of the pixel to be filtered to boundary 86.

In another example, d(i) can be set as d(i)=q(0)−p(i), d(i)=q(i)−p(0), (q(0)−p(i))/2, or d(i)=(q(i)−p(0))/2. In this example, the video coder determines the pixel value difference based on a pixel value of a pixel that is to be filtered (e.g., p(i) or q(i)), and a pixel value of a pixel in the other block that is closest to boundary 86. For instance, the pixel value difference for the ith pixel in block 84A is based on p(i) and q(0), where q(0) is the pixel value for the pixel that is closest to boundary 86 and in block 84B.

As another example, d at position i, d(i), can be calculated using neighboring pixels as d_p(i)=p(i+1)−p(i−1), or (p(i+1)−p(i−1))/2, and d_q(i)=q(i+1)−q(i−1), or (q(i+1)−q(i−1))/2. In this case, p(−1) can be set as q(0) and q(−1) can be set as p(0), respectively. In this example, the video coder determines the pixel value difference based on pixel values of pixels that neighbor the pixel to be deblock filtered. In other words, the video coder determines a pixel value difference based on a first neighboring pixel of the pixel to be deblock filtered, and a second neighboring pixel of the pixel to be deblock filtered. The two neighboring pixels may be in the same row or column. The video coder may not use the pixel value of the actual pixel to be deblock filtered, but utilizing the pixel value of the actual pixel to be deblock filtered may be possible.

Also, the neighboring pixels may be in the same block as the pixel to be deblock filtered, except for the pixels located closest to boundary 86. For example, assume the pixel with pixel value p(0) is to be deblock filtered. The neighboring pixels to the pixel with pixel value p(0) is p(1) and q(0). The pixel with pixel value p(1) is in the same block as the pixel with pixel value p(0) (e.g., block 84A), but the pixel with pixel value q(0) is in the different block (e.g., block 84B).

In some examples, d can be calculated by combining multiple of pixel value differences as a weighted sum. For example, $d(i)=\Sigma_j w(j) \times d(j)$, where $\Sigma_j w(j)=1$, $j=0 \ldots N-1$. In this example, the pixel value difference is based on a weighting of pixel value differences of pixel values of multiple pixels. In some examples, the pixel value difference is based on a weighting of pixel value differences of pixel values for all of the pixels to be deblock filtered, such as for the case where $q(j)-p(j)$ equals $d(j)$. In general, the equation of $d(j)$ may be that of any of the above example equations of $d(i)$.

In this example, the video coder may determine a weighting for at least the pixel value difference (e.g., the weighting for at least one instance of $d(j)$, where the equation of $d(j)$ is equal to any of the above equations for $d(i)$). In some examples, the video coder may determine a weighting for each of the pixel value differences (e.g., the weighting for every instance of $d(j)$). The weighting equation of $\Sigma_j w(j)=1$, $j=0 \ldots N-1$ is one example of a weighting equation, and the video coder may utilize other techniques to determine a weighting for the pixel value differences (i.e., $d(j)$).

With the pixel value difference (e.g., $d(i)$) and the geometrical distance of the pixel to be filtered to boundary 86 (e.g., $n(i)$), the video coder may determine the an amount by which to deblock filter the pixel (i.e., the pixel distance can be formed by combining $d(i)$ and $n(i)$). For example, $1(i)$ can be calculated by multiplying both terms. One example way in which the video coder may determine the amount by which to deblock filter is: $1(i)=d(i) \times (N-n(i))/N$. In other words, the video coder may determine the amount by which to deblock filter pixel value of a pixel based on a pixel value difference, a geometrical distance of the pixel from a boundary, and in some examples, the number of pixels to be deblock filtered (e.g., N).

The video coder may filter the pixel value (i.e., then, each pixel value is modified) based on the following equations: $p'(i)=g1(1, p(i))$, and $q'(i)=g2(1, q(i))$. As examples of functions g1 and g2, the video coder may perform the following equations: $p'(i)=p(i)+1(i)$, and $q'(i)=q(i)-1(i)$. In these equations, $p'(i)$ represents the deblock filtered pixel value for the ith pixel in block 84A, and $q'(i)$ represents the deblock filtered value for the ith pixel in block 84B.

However, in some cases, if $1(i)$ is a positive value, it may be possible for $p'(i)$ to be greater than a maximum allowable pixel value, or for $q'(i)$ to be less than a minimum allowable pixel value. If $1(i)$ is a negative value, it may be possible for $p'(i)$ to be less than a minimum allowable pixel value, and for $q'(i)$ to be greater than a maximum allowable pixel value. For example, the minimum pixel value may be 0, and the maximum pixel value may be 255.

In some examples, to ensure that the pixel value of the deblock filtered pixel is less than or equal to the maximum allowable pixel value and greater than or equal to the minimum allowable pixel value, the video coder may perform the following equations, which are additional examples of the g1 and g2 functions: $p'(i)=\text{clip}(\text{Min}, \text{Max}, p(i)+1(i))$, and $q'(i)=\text{clip}(\text{Min}, \text{Max}, q(i)-1(i))$, where, Min and Max represents the minimum and maximum pixel sample value. In this way, if $p(i)+1(i)$ is greater than or less than a maximum or minimum value, the video coder clips the pixel value of the deblock filtered pixel to Max or Min, respectively. Similarly, if $q(i)-1(i)$ is greater than or less than a maximum or minimum value, the video coder clips the pixel value of the deblock filtered pixel to Max or Min, respectively.

Moreover, in some examples, it may be possible to limit the amount by which a pixel value of a pixel is deblock filtered. For instance, in the deblock filtering process in HEVC, the modifiable pixel value (e.g., the amount by which a pixel value of a pixel is filtered) is limited and threshold value to set the limit can be signaled. In the same way, $1(i)$ can be clipped using a threshold value. For example, video encoder 20 may signal a maximum allowable adjustment threshold value (i.e., the absolute value of $1(i)$ is less than or equal to the maximum allowable adjustment threshold value), and video decoder 30 may receive such a threshold value. In some examples, the threshold value for HEVC deblock filter can be used by scaling it using a constant value, or a separate value can be signaled in the bitstream to determine the maximum allowable adjustment threshold value. It should be understood that limiting the amount by which a pixel value can be modified (e.g., filtered) is not necessary in every example.

In this manner, the video coder may determine an amount by which to deblock filter pixel values of pixels based pixel distances of the pixels to a boundary (i.e., where pixel distances are based on the pixel value differences and geometrical distance to a boundary of a block). For example, $1(i)$ is a value that is a function of the distances of the pixels to the boundary. In some examples, $1(i)$ may be considered as an offset value. In some examples, the number of pixels (n) is equal to at least eight.

In some examples, $1(i)$ may be greater for pixels that are closer to the boundary and less for pixels that are further from the boundary. For instance, one example of the equation for $1(i)$ is $d(i) \times (N-n(i))/N$. The value of $n(i)$ may be greater for pixels further away from boundary 86, and lower for pixels closer to boundary 86. Therefore, the value of $N-n(i)$ is smaller for pixels further away from boundary 86, and greater for pixel closer to boundary 86. Accordingly, $1(i)$ is greater for pixels closer to boundary 86, and is smaller for pixels further away from boundary 86.

The above description provides examples for ways in which a video coder (e.g., video encoder 20 or video decoder 30) performs deblock filtering, sometimes also referred to as a long filtering process. However, the video coder may not perform deblock filtering in all instances. The following describes conditions for when the long filtering process is invoked (e.g., examples when the video coder performs the deblock filtering techniques described in this disclosure).

For instance, the video coder may apply the long filter only to the smooth area so that the area with sharp edges or textures is not over smoothed by the deblocking filter. As described above, smoothing that is performed by the deblocking filtering techniques results in a reduction in the amount that pixel values change on opposite sides of a boundary. However, the video content may be such that there are edges in the video content. To smooth out (e.g., over smoothing) these edges may negatively impact visual quality.

For example, in the video block an edge may occur when there is a sudden change in pixel values between two neighboring pixels (such as a black portion neighboring a white portion within a block, as one example, but there are less severe examples of edges as well), and smoothing such portions may degrade visual quality. In this example, if deblock filtering were applied to the portion were the block portion transitions to a white portion, the result would be a graying at the edge (e.g., over smoothing) causing a degradation in video quality. Accordingly, it may be beneficial to not apply the deblock filtering techniques in portions where there are drastic natural edges (e.g., portions where the video content itself includes sudden changes in pixel values), and apply the deblock filtering techniques in portions where there are not drastic natural edges (e.g., video content that is relatively smooth to being with so that blocking artifacts added as part of video coding are removed and not the video content itself).

In the some examples, the video coder may determine the smoothness of the local area by the gradient. Based on the result of the determined smoothness from the gradient, the video coder may perform the deblocking filter.

For example, for a deblocking boundary with X pixels, assuming X×M pixels at each side of the boundary are processed when the long filter is applied. For instance, as illustrated in FIG. 4, for boundary 86, X refers to the number of vertical pixels along boundary 86, and M refers to the number of horizontal pixels to be deblock filtered. For a horizontal boundary, X would refer to the number of horizontal pixels along the horizontal boundary, and M refers to the number of vertical pixels to be deblock filtered. In the following description for gradient calculation, the variable "M" may be considered to be the same as the variable "N" above, where N indicated the number of pixels that are to be deblock filtered in a block.

In some examples, the video coder may determine the gradients of X×M' (M' is larger or equal to M) pixel area at each side of the deblocking boundary (e.g., each side of boundary 86) to determine whether or not to apply the long filter. Based on a determination that the gradients of both sides of the deblocking boundary are less than a threshold gradient value, the video coder may apply the long filter (i.e., one or more examples of the deblock filtering techniques described in this disclosure). Otherwise, video coder may not apply the long filter. In this manner, the long filtering process (e.g., the deblock filtering process described in this disclosure) may be considered as a first type of filtering, and any one of the other deblock filtering techniques such as those described in the above-referenced documents or the HEVC standard may be considered as a second type of filtering. In some examples, a video coder may determine a gradient based on neighboring pixels, and compare the gradient to a threshold gradient value. In these examples, the video coder may perform either the first type of filtering or the second type of filtering based on the comparison.

To reduce the computational complexity, the video coder may select only partial pixels to calculate the gradient of the X×M' pixels. For instance, the gradient may be calculated based on difference between two consecutive pixels. However, the video coder may determine the gradient using multiple pixels (e.g., or all of them in the block). For instance, a plane may be modeled and its slope can be estimated using the pixels in the block.

As an example, the interleaved pixels are used to calculate the gradient as follows: let $P(i, j)$, with $i=0, 1, 2 \ldots X-1$, $j=0, 1, 2 \ldots M'-1$, denote the pixels in one X×M' block, and the gradients of the block is calculated as: gradientH=$\Sigma_{i,j}$abs $(P(i, j)-P(i, \min(M'-1,j+1)))$ with $i=0 \ldots X-1$, $j=0 \ldots M'-1$, gradientV=$\Sigma_{i,j}$abs $(P(i, j)-P(\min(i+1, X-1),j)))$ with $i=0 \ldots X-1$, $j=0 \ldots M'-1$, and gradient=gradientH+gradientV. In this example, based on the video coder determining that the gradient is less than a threshold, the video coder may perform the deblock filtering techniques described in this disclosure. Also, based on the video coder determining that the gradient is greater than a threshold, the video coder may perform filtering techniques such as those in the HEVC standard.

In the above example, the video coder utilized both horizontal and vertical gradients (e.g., both the horizontal and vertical gradients) are taken into account for either horizontal or vertical deblocking boundary. In some examples, the video coder may determine the gradient of one direction, and no other direction, for a certain boundary, and take that gradient into account (e.g., vertical gradient is used when horizontal boundary is filtered and horizontal gradient is used when vertical boundary is filtered).

To reduce number of computation to calculate the gradient, the video coder may sub-sample the X×M' area to calculate the gradient. For example, the horizontal and vertical gradients can be calculated as: gradientH=$\Sigma_{i,j}$abs $(P(i, j)-P(i, \min(M'-1,j+1)))$ with ($i=0, 2, 4 \ldots X-2, j=0, 2, 4 \ldots M'-2$) and ($i=1, 3, 5 \ldots X-1, j=1, 3, 5 \ldots M'-1$), and gradientV=$\Sigma_{i,j}$abs $(P(i, j)-P(\min(i+1, X-1),j)))$ with ($i=0, 2, 4 \ldots N-2, j=0, 2, 4 \ldots M'-2$) and ($i=1, 3, 5 \ldots X-1, j=1, 3, 5 \ldots M'-1$).

In the above example, the video coder determines a gradient value for the X×M' region that includes all of the pixels of a block that are to be filtered (i.e., note that in the above example one gradient value for each X×M' region is calculated). In some examples, each region can be partitioned, and the video coder may determine (e.g., calculate) multiple gradients in each region to control filtering of each partition. As an example, the partition may be a line in the region of X×M'. In the below example, the area is segmented into each line, where the video coder determines horizontal gradient at position i as: gradientH(i)=$\Sigma_j$abs $(P(i, j)-P(i, \min(M'-1,j+1)))$ if boundary is vertical, and vertical gradient at position j as: gradientV(j)=$\Sigma_i$abs $(P(i, j)-P(\min(i+1, X-1), j)))$ if boundary is horizontal. Then, the video coder may control the filtering of pixels at vertical position i by gradientH(i), and the filtering of pixels at horizontal position j can be controlled by gradientV(j).

In some examples, it is also possible for the video coder to control filtering of each pixel by use of the gradient at each pixel position. For example, if the video coder determines that a gradient at a certain pixel position is higher than a threshold, this position can be considered as a true image edge and the video coder would avoid filtering of such a pixel (or at least not filter the pixel using the techniques described in this disclosure).

Moreover, in some examples, the video coder may combine the gradient determinations at the block (e.g., X×M'), segment or line partition, or pixel to determine the whether to deblock filter a pixel or pixels. In other words, in above examples—block level, segment or line level, and pixel level control—can be combined together to make the decision of the filtering.

In some examples, the video coder determines a gradient and compares the gradient to a threshold gradient. Based on the comparison, the video coder deblock filters a pixel value of a pixel using the techniques described in this disclosure, deblock filters a pixel value of a pixel using other techniques, or not deblock filer a pixel value. For example, if the gradient is less than the threshold gradient, the video coder may deblock filer pixel values of pixels using the techniques described in this disclosure; otherwise, the video coder may deblock filer using other techniques or not deblock filter.

Video encoder 20 may signal the threshold value for the gradient value (e.g., threshold gradient) in the SPS, PPS or slice header, and video decoder 30 may receive the threshold gradient in the SPS, PPS, or slice header. In some examples, the threshold value can be signaled separately for intra slice and non-intra slice. The signaled threshold value can be applied for other smoothness metrics, including the variance mentioned in the existing methods, such as in "CE12, Subset 1: Report of deblocking for large size blocks." In some examples, the threshold value can be a constant value which is the same at the encoder side (video encoder 20) and decoder side (video decoder 30), so that signaling can be avoided.

The video coder may apply the same threshold gradient value for each horizontal and vertical filtering direction, or different threshold value can be used for each filtering direction. If the threshold gradient values are different for different directions, for each direction, video encoder 20 may signal separate values that video decoder 30 receives. As another example, video encoder 20 may signal one value and scale the values differently to generate gradient threshold values for each direction.

In some examples, video encoder 20 and video decoder 30 may adjust the gradient threshold depending on information, available with both video encoder 20 and video decoder 30, such as transform block size (e.g., the size of the transform block used to for the encoding or decoding of a block), coding mode (e.g., intra- or inter-prediction coding), motion vector, reconstructed pixel values, etc. In some examples, video encoder 20 may signal different threshold gradient values for a set of cases, which can be selected by information available by both video encoder 20 and video decoder 30.

Based on the aforementioned metrics, the video coder may control the deblock filtering. As one example, the video coder may turn off the deblock filtering when the gradient is larger than a threshold gradient. In some examples, depending on the range of the gradient value, filtering with different strength can be applied. For example, the video coder may utilize the gradient to adjust the value of 1(i) (e.g., scale the value of 1(i) by the determined gradient). In other words, it is possible to diminish the pixel distance 1(i) according to the gradient, so that the amount of modification is reduced with small 1(i) for the area with large gradient, or the video coder may apply a weaker filter (e.g., filters defined in HEVC) when the gradient is not small enough.

In general, in some examples, the video coder may determine a gradient value of a portion of a block that includes one or more pixels whose pixel values are to be deblock filtered, where the gradient value indicates a smoothness of the portion of the block (i.e., indicates whether there are image edges in the portion of the block). The portion of the block may be a region that includes all of the pixels of the block that are to be deblock filtered (e.g., the X×M' region). In determining the gradient value, the video coder may utilize a sub-sample of the pixels in the region to determine the gradient value (i.e., need not necessarily use all of the pixels in the region for gradient value determination).

The portion of the block may be a one-dimensional line of the block that includes the pixels to be deblock filtered. In this example, the video coder may determine the gradient value on a line-by-line basis (e.g., gradient value for each line), and need not necessarily use all of the pixels in the line for gradient value determination. The portion of the block may potentially be each pixel to be filtered (e.g., gradient value for each pixel on a pixel-by-pixel basis).

The video coder may compare the gradient value to a threshold gradient value, and perform the deblock filtering techniques described in this disclosure based on the comparison. For instance, if the gradient value is less than the threshold gradient value, the video coder may perform deblock filtering techniques as described in this disclosure, and if greater than the threshold gradient value, the video coder may perform some other type of deblock filtering or may not perform deblock filtering.

Moreover, in some examples, both video encoder 20 and video decoder 30 may not need to determine a gradient value. For instance, video encoder 20 may determine a gradient value, and determine whether to perform deblock filtering as described in this disclosure. Video encoder 20 may signal a syntax element (e.g., a flag) that indicates whether a block is to be deblock filtered using the techniques described in this disclosure. In such cases, video decoder 30 may not need to determine the gradient value or determine whether to perform deblock filtering as described in this disclosure based on the gradient value. In this way, video decoder 30 may not need to determine the gradient value, which can potentially be a computationally complex process.

However, for bandwidth efficiency, in some examples, video decoder 30 may perform gradient value calculation and determine whether to perform deblock filtering techniques described in this disclosure based on the determined gradient value. In this way, no additional syntax element indicating whether to perform deblock filtering techniques described in this disclosure would be needed, as video decoder 30 would make such a determination.

The above describes one example that the video coder may utilize to determine whether to perform the deblock filtering techniques described in this disclosure. However, determining whether to perform the deblock filtering described in this disclosure based on the gradient value is one example. The below describes additional examples how the filter is applied in combination with the existing HEVC deblocking filters.

In some examples, the video coder may apply the deblock filtering techniques described in this disclosure when one or more of the example conditions described below are satisfied. Otherwise, the deblock filtering process defined in other proposals (e.g., HEVC specification) may be applied.

Also, in the following examples, the video coder may also use the gradient value determination, in addition to the below conditions, to determine whether to perform the deblock filtering techniques described in this disclosure. For example, even if none of the following conditions is true, but the gradient from the two 8×8 blocks of the TU boundary is smaller than a certain threshold, the video coder may perform deblock filtering techniques described in this disclosure.

In some examples, the video coder may determine the sizes to two adjacent (e.g., neighboring) TUs. Again, a TU is a block that is transformed and quantized by video encoder 20 and inverse quantized and inverse transformed by video decoder 30. It should be noted that in some cases the transform and/or quantization of a block may be skipped. For a TU, there is a transform block for the luma component, a transform block for a first chroma component, and a transform block for a second chroma component. In this disclosure, the size of the TU refers to a size of a transform block, which may be a transform block for the luma component or either of the chroma components. For example, the video coder may perform the deblock filtering techniques for blocks of the luma component and the two chroma components. For one or more of the components, the video coder may determine the sizes of two adjacent transform blocks.

Based on the determination that the larger transform size between the two adjacent TUs (e.g., transform block of one of the components) being equal to the maximum allowable transform block size (e.g., MaxTrafoSize), the video coder may perform deblock filtering techniques described in this disclosure. In some examples, the maximum allowable transform block size is 32×32.

In some examples, in addition to one of the blocks being equal to the maximum allowable transform block size, the video coder may determine whether the related CU is intra-coded (intra-prediction coded) or inter-coded (inter-prediction coded). The CU being the block that is coded, and the TU is a portion of the block.

If the video coder determines that the related CU is intra-coded, and one of the adjacent TUs is the maximum allowable transform block size. The video coder deblock filters pixel values utilizing the techniques described in this disclosure. If the video coder determines that the related CU is not intra-coded, but the partition size of the CU is 2N×2N and cbf of the TU is equal to 1 (i.e., transform of the TU is skipped), the video coder may perform the deblock filtering techniques described in this disclosure.

In another example, either or both of below conditions can be added on top of the two conditions above. For instance, if the maximum transform unit size (MaxTrafoSize) is larger than or equal to 16×16, the video coder may be configured to perform the deblock filtering techniques described in this disclosure.

Also, one of the above conditions was based on whether the size of one of the adjacent TUs is equal to the maximum allowable TU size. The following is an example of conditions based on whether the size of the smaller of the adjacent TUs being greater than or equal to a particular size. For example, if the video coder determines that the smaller transform size between the two TUs is larger than or equal to 16×16, the video coder may perform the deblock filtering techniques described in this disclosure. For example, if the related CU is intra-coded, and the smaller transform size between the two TUs is larger than or equal to 16×16, the video coder may perform the deblock filtering techniques described in this disclosure. As another example, if the related CU is not intra-coded and the partition size of the CU is 2N×2N, and the smaller transform size between the two TUs is larger than or equal to 16×16, the video coder may perform the deblock filtering techniques described in this disclosure.

It should be understood that the above example conditions for when the deblock filtering techniques are applied are provided for purposes of illustration only. There may be other conditions that the video coder may evaluate to determine whether to perform the deblock filtering techniques described in this disclosure.

Figure 2:
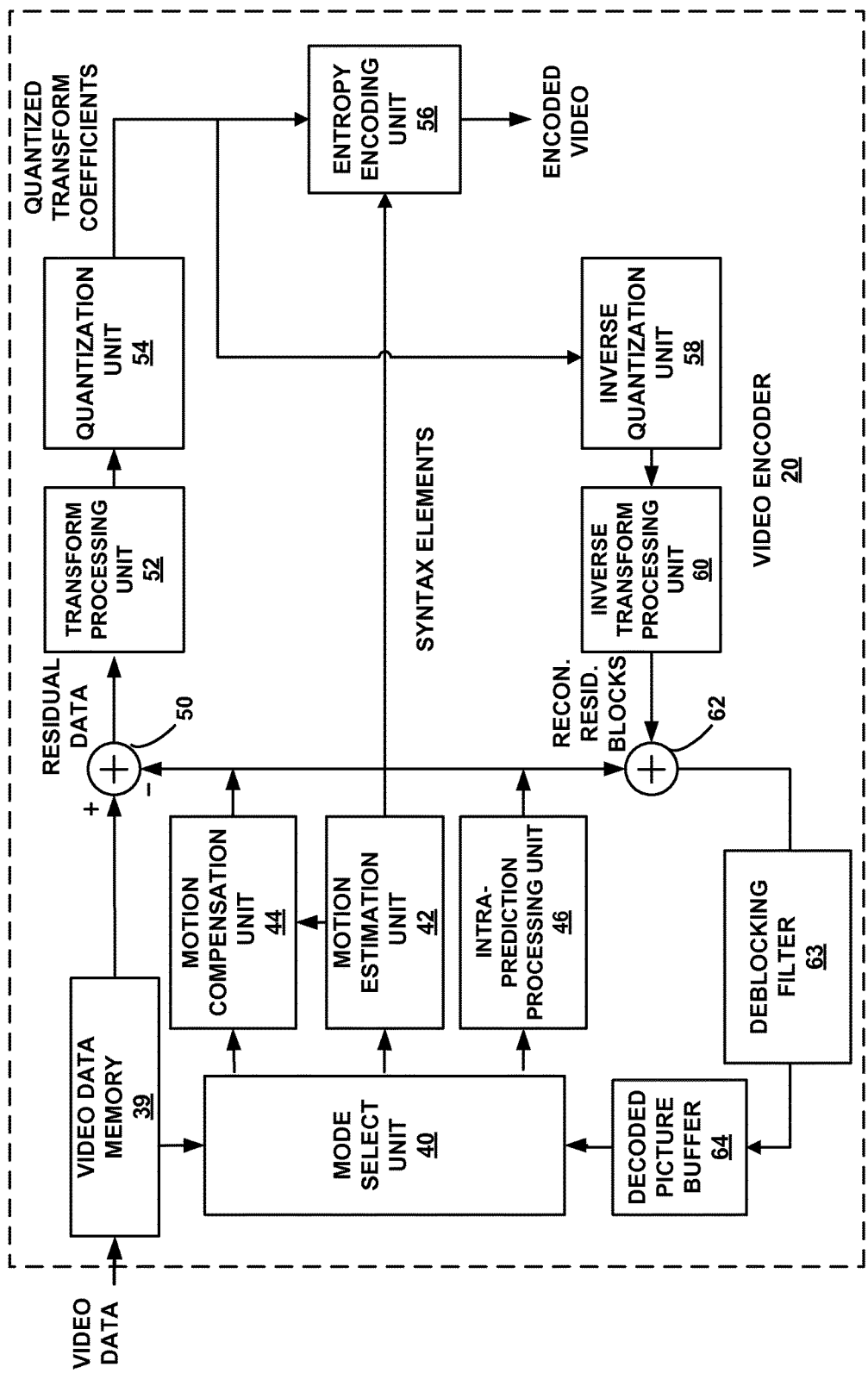
FIG. 2 is a block diagram illustrating an example video encoder that may implement the techniques described in this disclosure.

FIG. 2 is a block diagram illustrating an example of a video encoder 20 that may use techniques as described in this disclosure. The video encoder 20 will be described in the context of HEVC coding for purposes of illustration, but without limitation of this disclosure as to other coding standards or methods that utilize deblock filtering. The video encoder 20 may perform intra- and inter-coding of CUs within video frames. Intra-coding relies on spatial prediction to reduce or remove spatial redundancy in video data within a given video frame. Inter-coding relies on temporal prediction to reduce or remove temporal redundancy between a current frame and previously coded frames of a video sequence. Intra-mode (I-mode) may refer to any of several spatial-based video compression modes. Inter-modes such as uni-directional prediction (P-mode) or bi-directional prediction (B-mode) may refer to any of several temporal-based video compression modes.

As shown in FIG. 2, video data memory 39 receives video data that is used for encoding a current video block within a video frame. Video data memory 39 may store video data to be encoded by the components of video encoder 20 (e.g., configured to store video data). The video data stored in video data memory 39 may be obtained, for example, from video source 18. Decoded picture buffer (DPB) 64 (also referred to as reference picture buffer or reference frame buffer) is one example of a buffer that stores reference video data for use in encoding video data by video encoder 20 (e.g., in intra or inter-coding modes, also referred to as intra- or inter-prediction coding modes). Video data memory 39 and DPB 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 39 and DPB 64 may be provided by the same memory device or separate memory devices. In various examples, video data memory 39 may be on-chip with other components of video encoder 20, or off-chip relative to those components.

In the example of FIG. 2, video encoder 20 includes a motion compensation unit 44, a motion estimation unit 42, an intra-prediction processing unit 46, a decoded picture buffer (DPB) 64, a summer 50, a transform processing unit 52, a quantization unit 54, and an entropy encoding unit 56. Transform processing unit 52 illustrated in FIG. 2 is the unit that applies the actual transform or combinations of transform to a block of residual data, and is not to be confused with a block of transform coefficients, which also may be referred to as a transform unit (TU) of a CU. For video block reconstruction, video encoder 20 also includes an inverse quantization unit 58, an inverse transform processing unit 60, and a summer 62.

A deblocking filter 63 may deblock filter block boundaries to remove blockiness artifacts from reconstructed video. In some examples, deblocking filter 63 may be configured to implement the example techniques described in this disclosure, and do so in combination with other units of video encoder 20. For example, deblocking filter 63, alone or in combination with other units of video encoder 20, may determine a geometrical distance from a first pixel of a first block to a boundary between the first block and a second block, determine a pixel value difference based on a pixel value of a second pixel and a pixel value of a third pixel, determine an amount by which to deblock filter the pixel value of the first pixel based on the geometrical distance and the pixel value difference, and deblock filter the pixel value of the first pixel based on the amount by which to deblock filter.

Although not illustrated in FIG. 2, video encoder 20 may include a sample adaptive offset (SAO) filter and/or an adaptive loop filter (ALF). The SAO filter and/or ALF filter may be located before deblocking filter 63 or after deblocking filter 63. Where deblocking filter 63 is configured to reduce blockiness between neighboring blocks, the SAO filter and/or ALF filter may be configured to perform other types of filtering so that the video content appears to be the same as the original video content, or so as to increase video coding efficiency. Deblocking filter 63 may not necessarily, although possibly, apply filtering to modify the pixel values so that the reconstructed block is more like the original block. Rather, deblocking filter 63 removes blockiness. Also, the SAO and ALF filters may only be based on video data of the same block, where deblocking filter 63 utilizes video data from different blocks.

During the encoding process, video encoder 20 receives a video frame or slice to be coded. The frame or slice may be divided into multiple video blocks, e.g., largest coding units (LCUs). Motion estimation unit 42 and motion compensation unit 44 perform inter-predictive coding of the received video block relative to one or more blocks in one or more reference frames to provide temporal compression. Intra-prediction processing unit 46 may perform intra-predictive coding of the received video block relative to one or more neighboring blocks in the same frame or slice as the block to be coded to provide spatial compression.

Mode select unit 40 may select one of the coding modes, intra or inter, e.g., based on error (i.e., distortion) results for each mode, and provides the resulting intra- or inter-predicted block (e.g., a PU) to summer 50 to generate residual block data and to summer 62 to reconstruct the encoded block for use in a reference frame. Summer 62 combines the predicted block with inverse quantized, inverse transformed data from inverse transform processing unit 60 for the block to reconstruct the encoded block, as described in greater detail below. Some video frames may be designated as I-frames, where all blocks in an I-frame are encoded in an intra-prediction mode. In some cases, intra-prediction processing unit 46 may perform intra-prediction encoding of a block in a P- or B-frame, e.g., when the motion search performed by motion estimation unit 42 does not result in a sufficient prediction of the block.

Motion estimation unit 42 and motion compensation unit 44 may be highly integrated, but are illustrated separately for conceptual purposes. Motion estimation (or motion search) is the process of generating motion vectors, which estimate motion for video blocks. A motion vector, for example, may indicate the displacement of a prediction unit in a current frame relative to a reference sample of a reference frame. Motion estimation unit 42 calculates a motion vector for a prediction unit of an inter-coded frame by comparing the prediction unit to reference samples of a reference frame stored in DPB 64. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice, and not necessarily at a block (e.g., coding unit) boundary of the reference frame or slice. In some examples, the reference sample may occur at a fractional pixel position.

In order to expand the search space from which motion estimation unit 42 may locate a reference block, motion estimation unit 42 may perform interpolation filtering on a reference picture. The pixels that are included in a reference picture are referred to as integer pixels and are located at integer pixel positions. As part of performing interpolation filtering, motion estimation unit 42 may interpolate pixel values (i.e. calculate new pixel values for new pixel locations) between the integer pixels. These interpolated pixels are referred to as sub-pixels or fractional pixels. To identify a reference block, motion estimation unit 42 may search both the integer pixels and the fractional pixels to locate a desirable reference block.

Motion estimation unit 42 sends the calculated motion vector to entropy encoding unit 56 and motion compensation unit 44. The portion of the reference frame identified by a motion vector may be referred to as a reference sample. Motion compensation unit 44 may calculate a prediction value for a prediction unit of a current CU, e.g., by retrieving the reference sample identified by a motion vector for the PU.

Intra-prediction processing unit 46 may intra-predict the received block, as an alternative to inter-prediction performed by motion estimation unit 42 and motion compensation unit 44. Intra-prediction processing unit 46 may predict the received block relative to neighboring, previously coded blocks, e.g., blocks above, above and to the right, above and to the left, or to the left of the current block, assuming a left-to-right, top-to-bottom encoding order for blocks. Intra-prediction processing unit 46 may be configured with a variety of different intra-prediction modes. For example, intra-prediction processing unit 46 may be configured with a certain number of directional prediction modes, e.g., thirty-three directional prediction modes, based on the size of the CU being encoded.

Intra-prediction processing unit 46 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, intra-prediction processing unit 46 may calculate an error value for the prediction mode based on pixel differences between the PU and the received block to be encoded. Intra-prediction processing unit 46 may continue testing intra-prediction modes until an intra-prediction mode that yields an acceptable error value is discovered. Intra-prediction processing unit 46 may then send the PU to summer 50.

Video encoder 20 forms a residual block by subtracting the prediction data calculated by motion compensation unit 44 or the intra-prediction processing unit 46 from the original video block being coded. Summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. The differences may be chroma or luma differences depending on the type of block that is coded.

Transform processing unit 52 may form one or more TUs from the residual block. Transform processing unit 52 selects a transform from among a plurality of transforms. The transform may be selected based on one or more coding characteristics, such as block size, coding mode, or the like. Transform processing unit 52 then applies the selected transform to the TU, producing a video block comprising a two-dimensional array of transform coefficients.

Transform processing unit 52 may send the resulting transform coefficients to quantization unit 54. Quantization unit 54 may then quantize the transform coefficients. Entropy encoding unit 56 may then perform a scan of the quantized transform coefficients in the matrix according to a scanning mode. This disclosure describes entropy encoding unit 56 as performing the scan. However, it should be understood that, in other examples, other processing units, such as quantization unit 54, could perform the scan.

Once the transform coefficients are scanned into the one-dimensional array, entropy encoding unit 56 may apply entropy coding such as CABAC, syntax-based context-adaptive binary arithmetic coding (SBAC), Probability Interval Partitioning Entropy (PIPE), or another entropy coding methodology to the coefficients. Entropy encoding unit 56 may be configured to code the transform coefficients. To perform CABAC, entropy encoding unit 56 may select a context model to apply to a certain context to encode symbols to be transmitted. Following the entropy coding by entropy encoding unit 56, the resulting encoded video may be transmitted to another device, such as video decoder 30, or archived for later transmission or retrieval.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of DPB 64. Motion compensation unit 44 may also apply one or more interpolation filters to the reconstructed residual block to calculate sub-integer pixel values for use in motion estimation.

Summer 62 adds the reconstructed residual block to the motion compensated prediction block located (possibly with interpolation filtering) by motion compensation unit 44 to produce a reconstructed video block for storage in DPB 64. The reconstructed video block may be used by motion estimation unit 42 and motion compensation unit 44 as a reference block to inter-code a block in a subsequent video frame.

In this manner, video encoder 20 may be an example of a video encoder that includes one or more processors that are configured to determine an amount by which to deblock filter pixel values of pixels based on pixel distances of the pixels to a boundary, and deblock filter based on the determined amount. In some examples, video encoder 20 may determine the amount by which to deblock filter pixel values of at least eight pixels. In some example, video encoder 20 may determine that pixel values of pixels that are closer to the boundary are modified more than pixel values of pixels that are further away from the boundary. In some examples, video encoder 20 may determine an offset value that is a function of the pixel distances of the pixels to the boundary to determine the amount by which to deblock filter.

In some examples, video encoder 20 may determine whether perform a first type of filter (e.g., the long deblock filtering as described in this disclosure). Video encoder 20 may perform a second type of deblock filtering (e.g., as defined in the base HEVC standard) if determined not to perform the first type of filtering. In some example, video encoder 20 may determine a gradient based on neighboring blocks, and may compare the gradients to a threshold value. In such examples, video encoder 20 may perform the deblock filtering techniques described in this disclosure based on the comparison, or perform deblock filtering techniques such as those in the HEVC standard or some other deblock filtering technique based on the comparison.

Figure 3:
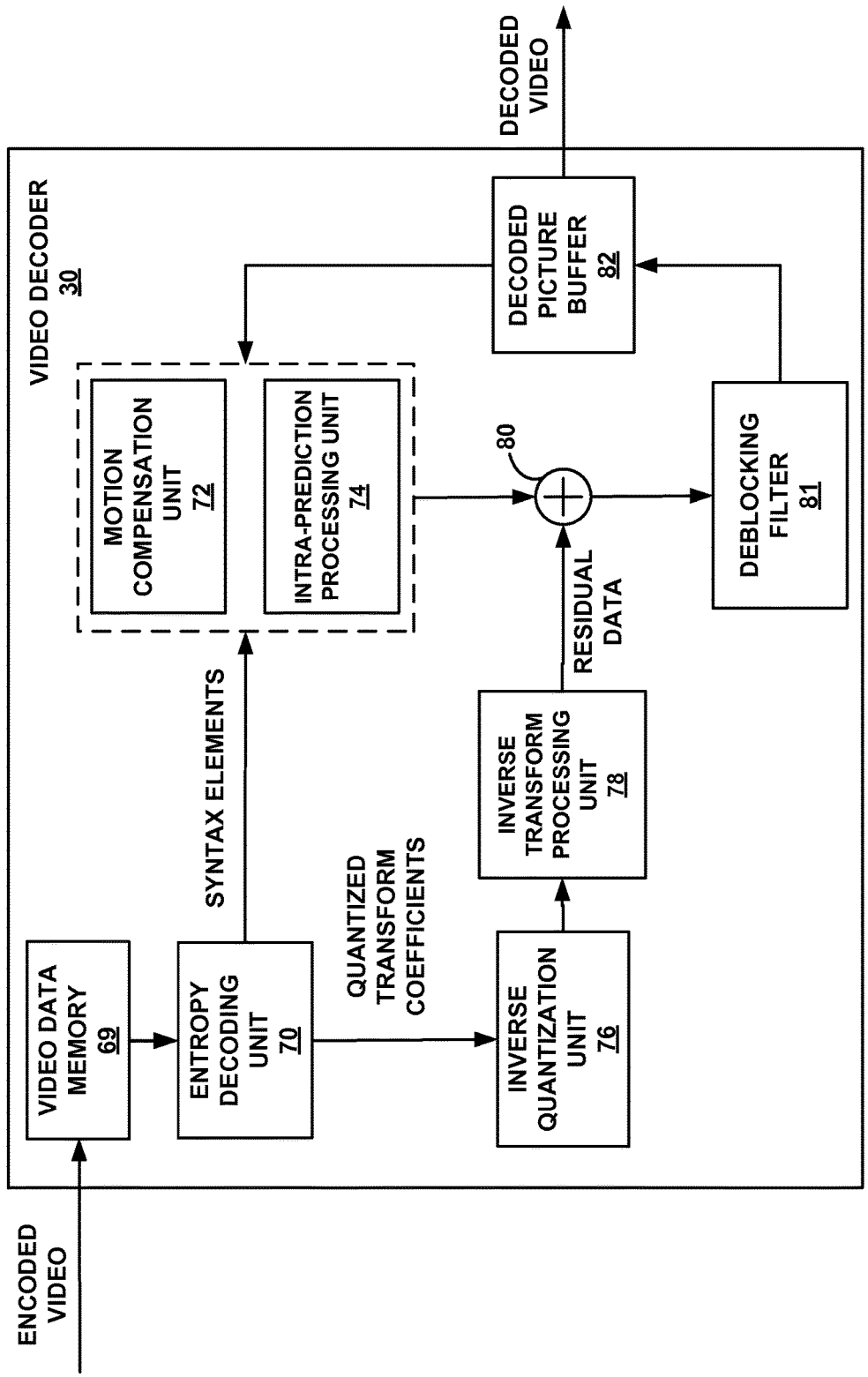
FIG. 3 is a block diagram illustrating an example video decoder that may implement the techniques described in this disclosure.

FIG. 3 is a block diagram illustrating an example of a video decoder 30, which decodes an encoded video sequence. Video decoder 30 represents an example of a device configured to perform methods for deblock filtering. In the example of FIG. 3, video data memory 69 receives encoded video. Video data memory 69 may store video data (e.g., configured to store video data), such as an encoded video bitstream, to be decoded by the components of video decoder 30. The video data stored in video data memory 69 may be obtained from a local video source, such as a camera, via wired or wireless network communication of video data, or by accessing physical data storage media. Video data memory 69 may form a coded picture buffer (CPB) that stores encoded video data from an encoded video bitstream.

Decoded picture buffer (DPB) 82 that stores reference video data for use in decoding video data by video decoder 30 (e.g., in intra- or inter-coding modes). Video data memory 69 and DPB 82 may be formed by any of a variety of memory devices, such as DRAM, including SDRAM, MRAM, RRAM, or other types of memory devices. Video data memory 69 and DPB 82 may be provided by the same memory device or separate memory devices. In various examples, video data memory 69 may be on-chip with other components of video decoder 30, or off-chip relative to those components.

Video decoder 30 includes an entropy decoding unit 70, a motion compensation unit 72, an intra-prediction processing unit 74, an inverse quantization unit 76, an inverse transform processing unit 78, a decoded picture buffer (DPB) 82 and a summer 80. The video decoder 30 of FIG. 3 may, in some examples, perform a decoding pass generally reciprocal to the encoding pass described with respect to the video encoder 20 (see FIG. 2).

The entropy decoding unit 70 performs an entropy decoding process on the encoded bit stream to retrieve a one-dimensional array of transform coefficients. The entropy decoding process used depends on the entropy coding used by the video encoder 20 (e.g., CABAC). The entropy coding process used by the encoder may be signaled in the encoded bitstream or may be a predetermined process. Entropy decoding unit 70 may be configured to code the transform coefficients.

In some examples, the entropy decoding unit 70 (or the inverse quantization unit 76) may scan the received values using a scan mirroring the scanning mode used by the entropy encoding unit 56 (or the quantization unit 54) of the video encoder 20. Although the scanning of coefficients may be performed in the inverse quantization unit 76, scanning will be described for purposes of illustration as being performed by the entropy decoding unit 70. In addition, although shown as separate functional units for ease of illustration, the structure and functionality of the entropy decoding unit 70, the inverse quantization unit 76, and other units of the video decoder 30 may be highly integrated with one another.

The inverse quantization unit 76 inverse quantizes, i.e., de-quantizes, the quantized transform coefficients provided in the bitstream and decoded by the entropy decoding unit 70. The inverse quantization process may include a conventional process, e.g., similar to the processes proposed for HEVC or defined by the H.264 decoding standard. The inverse quantization process may include use of a quantization parameter QP calculated by the video encoder 20 for the CU to determine a degree of quantization and, likewise, a degree of inverse quantization that should be applied. The inverse quantization unit 76 may inverse quantize the transform coefficients either before or after the coefficients are converted from a one-dimensional array to a two-dimensional array.

The inverse transform processing unit 78 applies an inverse transform to the inverse quantized transform coefficients. In some examples, the inverse transform processing unit 78 may determine an inverse transform based on signaling from the video encoder 20, or by inferring the transform from one or more coding characteristics such as block size, coding mode, or the like. In some examples, the inverse transform processing unit 78 may determine a transform to apply to the current block based on a signaled transform at the root node of a quadtree for an LCU including the current block. Alternatively, the transform may be signaled at the root of a TU quadtree for a leaf-node CU in the LCU quadtree. In some examples, the inverse transform processing unit 78 may apply a cascaded inverse transform, in which inverse transform processing unit 78 applies two or more inverse transforms to the transform coefficients of the current block being decoded. The intra-prediction processing unit 74 may generate prediction data for a current block of a current frame based on a signaled intra-prediction mode and data from previously decoded blocks of the current frame.

The motion compensation unit 72 may retrieve the motion vector, motion prediction direction and reference index from the encoded bitstream. The reference prediction direction indicates whether the inter-prediction mode is uni-directional (e.g., a P frame) or bi-directional (a B frame). The reference index indicates which reference frame the candidate motion vector is based on.

Based on the retrieved motion prediction direction, reference frame index, and motion vector, the motion compensation unit produces a motion compensated block for the current portion. These motion compensated blocks essentially recreate the predictive block used to produce the residual data.

The motion compensation unit 72 may produce the motion compensated blocks, possibly by performing on the same interpolation filtering performed by motion compensation unit 44. Identifiers for interpolation filters to be used for motion estimation with sub-pixel precision may be included in the syntax elements. The motion compensation unit 72 may use interpolation filters as used by the video encoder 20 during encoding of the video block to calculate interpolated values for sub-integer pixels of a reference block. The motion compensation unit 72 may determine the interpolation filters used by the video encoder 20 according to received syntax information and use the interpolation filters to produce predictive blocks.

Additionally, the motion compensation unit 72 and the intra-prediction processing unit 74, in an HEVC example, may use some of the syntax information (e.g., provided by a quadtree) to determine sizes of LCUs used to encode frame(s) of the encoded video sequence. The motion compensation unit 72 and the intra-prediction processing unit 74 may also use syntax information to determine split information that describes how each CU of a frame of the encoded video sequence is split (and likewise, how sub-CUs are split). The syntax information may also include modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

The summer 80 combines the residual blocks with the corresponding prediction blocks generated by the motion compensation unit 72 or the intra-prediction processing unit 74 to form decoded blocks. A deblocking filter 81 may also be applied to filter the decoded blocks in order to remove blockiness artifacts. Deblocking filter 81 may be configured to implement the example deblock filtering techniques described in this disclosure. For example, deblocking filter 81, alone or in combination with other components, may determine a geometrical distance from a first pixel of a first block to a boundary between the first block and a second block, determine a pixel value difference based on a pixel value of a second pixel and a pixel value of a third pixel, determine an amount by which to deblock filter the pixel value of the first pixel based on the geometrical distance and the pixel value difference, and deblock filtering the pixel value of the first pixel based on the amount by which to deblock filter. The decoded video blocks are then stored in the DPB 82, which provides reference blocks for subsequent motion compensation and also produces decoded video for presentation on a display device (such as the display device 32 of FIG. 1).

Like FIG. 2, although not illustrated in FIG. 3, video decoder 30 may include a sample adaptive offset (SAO) filter and/or an adaptive loop filter (ALF). The SAO filter and/or ALF filter may be located before deblocking filter 81 or after deblocking filter 81. Where deblocking filter 81 is configured to reduce blockiness between neighboring blocks, the SAO filter and/or ALF filter may be configured to perform other types of filtering so that the video content appears to be the same as the original video content, or so as to increase video coding efficiency. Deblocking filter 81 may not necessarily, although possibly, apply filtering to modify the pixel values so that the reconstructed block is more like the original block. Rather, deblocking filter 81 removes blockiness. Also, the SAO and ALF filters may only be based on video data of the same block, where deblocking filter 81 utilizes video data from different blocks.

In this manner, video decoder 30 may be an example of a video decoder that includes one or more processors that are configured to determine an amount by which to deblock filter pixel values of pixels based on pixel distances of the pixels to a boundary, and deblock filter based on the determined amount. In some examples, video decoder 30 may determine the amount by which to deblock filter pixel values of at least eight pixels. In some example, video decoder 30 may determine that pixel values of pixels that are closer to the boundary are modified more than pixel values of pixels that are further away from the boundary. In some examples, video decoder 30 may determine an offset value that is a function of the pixel distances of the pixels to the boundary to determine the amount by which to deblock filter.

In some examples, video decoder 30 may determine whether perform a first type of filter (e.g., the long deblock filtering as described in this disclosure). Video decoder 30 may perform a second type of deblock filtering (e.g., as defined in the base HEVC standard) if determined not to perform the first type of filtering. In some example, video decoder 30 may determine a gradient based on neighboring blocks, and may compare the gradients to a threshold value. In such examples, video decoder 30 may perform the deblock filtering techniques described in this disclosure based on the comparison, or perform deblock filtering techniques such as those in the HEVC standard or some other deblock filtering technique based on the comparison.

Figure 5:
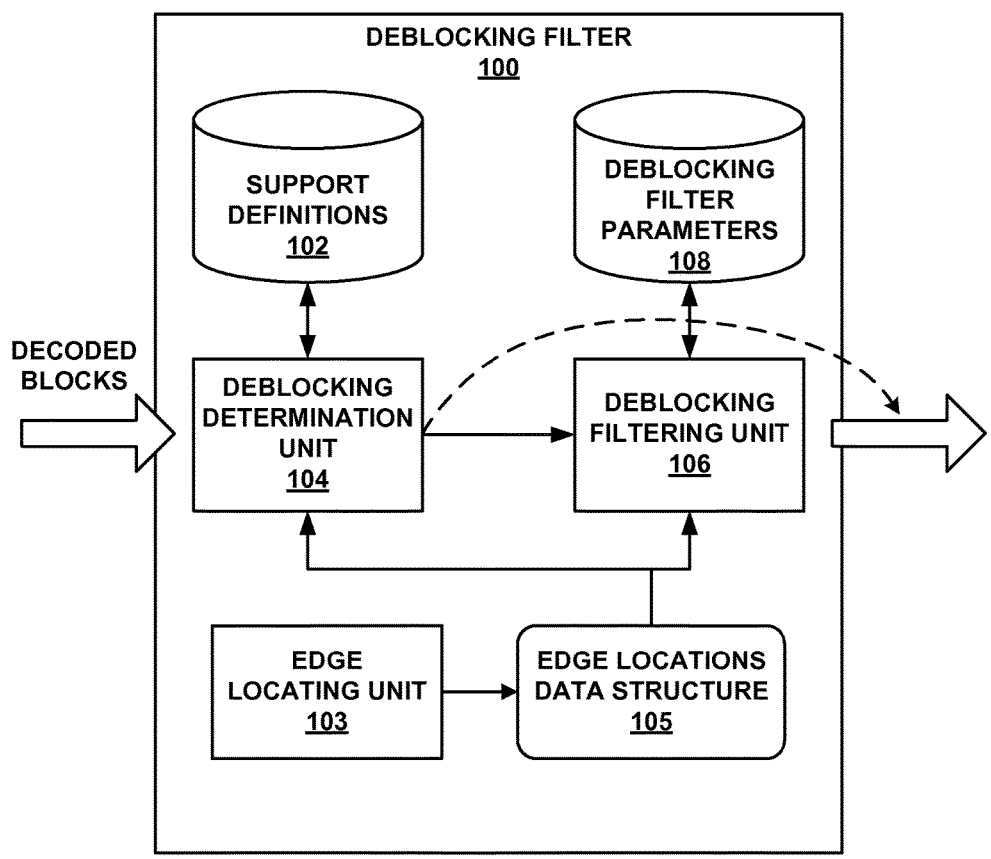
FIG. 5 is a block diagram illustrating components of an exemplary deblocking filter defined based on the deblocking filter parameters signaled according to the techniques described in this disclosure.

FIG. 5 is a block diagram illustrating components of an exemplary deblocking filter 100 defined based on techniques described in this disclosure. In general, either or both of deblocking filter 63 from FIG. 2 and deblocking filter 81 from FIG. 3 may include components substantially similar to those of deblocking filter 100. Other video coding devices, such as video encoders, video decoders, video encoder/decoders (CODECs), and the like may also include components substantially similar to deblocking filter 100. Deblocking filter 100 may be implemented in hardware, software, or firmware, or any combination thereof. When implemented in software or firmware, corresponding hardware (such as one or more processors or processing units and memory for storing instructions for the software or firmware) may also be provided.

In the example of FIG. 5, deblocking filter 100 includes deblocking determination unit 104, support definitions 102 stored in memory, deblocking filtering unit 106, deblocking filter definitions 108 stored in memory, edge locating unit 103, and edge locations data structure 105. Any or all of the components of deblocking filter 100 may be functionally integrated. The components of deblocking filter 100 are illustrated separately only for purposes of illustration. In general, deblocking filter 100 receives data for decoded blocks (or reconstructed blocks), e.g., from a summation component that combines prediction data with residual data for the blocks. The data may further include an indication of how the blocks were predicted. In the example described below, deblocking filter 100 is configured to receive data including a decoded video block associated with a LCU and a CU quadtree for the LCU, where the CU quadtree describes how the LCU is partitioned into CUs and prediction modes for PUs and TUs of leaf-node CUs.

Deblocking filter 100 may maintain edge locations data structure 105 in a memory of deblocking filter 100, or in an external memory provided by a corresponding video coding device. In some examples, edge locating unit 103 may receive a CU quadtree corresponding to an LCU that indicates how the LCU is partitioned into CUs. Edge locating unit 103 may then analyze the CU quadtree to determine edges (e.g., boundaries) between decoded video blocks associated with TUs and PUs of CUs in the LCU that are candidates for deblocking. For example, edge locating unit 103 may locate boundary 86.

Edge locations data structure 105 may comprise an array having a horizontal dimension, a vertical dimension, and a dimension representative of horizontal edges and vertical edges. In general, edges (e.g., boundaries) between video blocks may occur between two video blocks associated with smallest-sized CUs of the LCU, or TUs and PUs of the CUs. Assuming that the LCU has a size of N×N, and assuming that the smallest-sized CU of the LCU is of size M×M, the array may comprise a size of [N/M]×[N/M]×2, where "2" represents the two possible directions of edges between CUs (horizontal and vertical). For example, assuming that an LCU has 64×64 pixels and a 8×8 smallest-sized CU, the array may comprise [8]×[8]×[2] entries.

Each entry may generally correspond to a possible edge between two video blocks. Edges might not in fact exist at each of the positions within the LCU corresponding to each of the entries of edge locations data structure 105. Accordingly, values of the data structure may be initialized to false. In general, edge locating unit 103 may analyze the CU quadtree to determine locations of edges between two video blocks associated with TUs and PUs of CUs of the LCU and set corresponding values in edge locations data structure 105 to true.

In general, the entries of the array may describe whether a corresponding edge exists in the LCU as a candidate for deblocking That is, when edge locating unit 103 determines that an edge between two neighboring video blocks associated with TUs and PUs of CUs of the LCU exists, edge locating unit 103 may set a value of the corresponding entry in edge locations data structure 105 to indicate that the edge exists (e.g., to a value of "true").

Deblocking determination unit 104 generally determines whether, for two neighboring blocks, an edge between the two blocks should be deblocked. Deblocking determination unit 104 may determine locations of edges using edge locations data structure 105. When a value of edge locations data structure 105 has a Boolean value, deblocking determination unit 104 may determine that a "true" value indicates the presence of an edge, and a "false" value indicates that no edge is present, in some examples. For example, deblocking determination unit 104 may determine the gradient and determine whether to deblock filter utilizing the techniques described in this disclosure. As another example, deblocking determination unit 104 may determine the transform size, and whether the CU is intra-coded or not intra-coded and utilize such information to determine whether to deblock filter utilizing the techniques described in this disclosure.

In general, deblocking determination unit 104 is configured with one or more deblocking determination functions. The functions may include a plurality of coefficients applied to lines of pixels that cross the edge between the blocks. For example, the functions may be applied to a line of eight pixels that is perpendicular to the edge, where four of the pixels are in one of the two blocks and the other four pixels are in the other of the two blocks. Support definitions 102 define support for the functions. In general, the "support" corresponds to the pixels to which the functions are applied. Various examples of sets of support are described in greater detail below with respect to FIG. 6.

Deblocking determination unit 104 may be configured to apply one or more deblocking determination functions to one or more sets of support, as defined by support definitions 102, to determine whether a particular edge between two blocks of video data should be deblocked. The dashed line originating from deblocking determination unit 104 represents data for blocks being output without being filtered. In cases where deblocking determination unit 104 determines that an edge between two blocks should not be filtered, deblocking filter 100 may output the data for the blocks without altering the data. That is, the data may bypass deblocking filtering unit 106. On the other hand, when deblocking determination unit 104 determines that an edge should be deblocked, deblocking determination unit 104 may cause deblocking filtering unit 106 to filter values for pixels near the edge in order to deblock the edge.

Deblocking filtering unit 106 retrieves definitions of deblocking filters from deblocking filter parameters 108 for edges to be deblocked, as indicated by deblocking determination unit 104. In general, filtering of an edge uses values of pixels from the neighborhood of a current edge to be deblocked. Therefore, both deblocking decision functions and deblocking filters may have a certain support region on both sides of an edge. By applying a deblocking filter to pixels in the neighborhood of an edge (e.g., boundary), deblocking filtering unit 106 may smooth the values of the pixels such that high frequency transitions near the edge are dampened. In this manner, application of deblocking filters to pixels near an edge (e.g., boundary) may reduce blockiness artifacts near the edge.

FIG. 6 is a conceptual diagram illustrating pixel positions near an edge (i.e., boundary) 134 of a video block between sub-blocks 130 and 132. As one example, boundary 134 may comprise an inner CU edge such as a TU edge between two TUs defined in the CU, or a PU edge between two PUs defined in the CU. Each of the pixel positions is designated using the format $[p|q]I_J$, where p corresponds to sub-block 130 and q corresponds to sub-block 132, I corresponds to a distance from edge 134, and J corresponds to a row indicator from top to bottom of sub-blocks 130 and 132. In some examples, support used for deblocking decision functions and deblocking filters has a line of eight pixels. In such examples, for a given line X where $0 \leq X \leq 7$, each of pixels $p3_x$ to $q3_x$ may be used as support.

Figure 7:
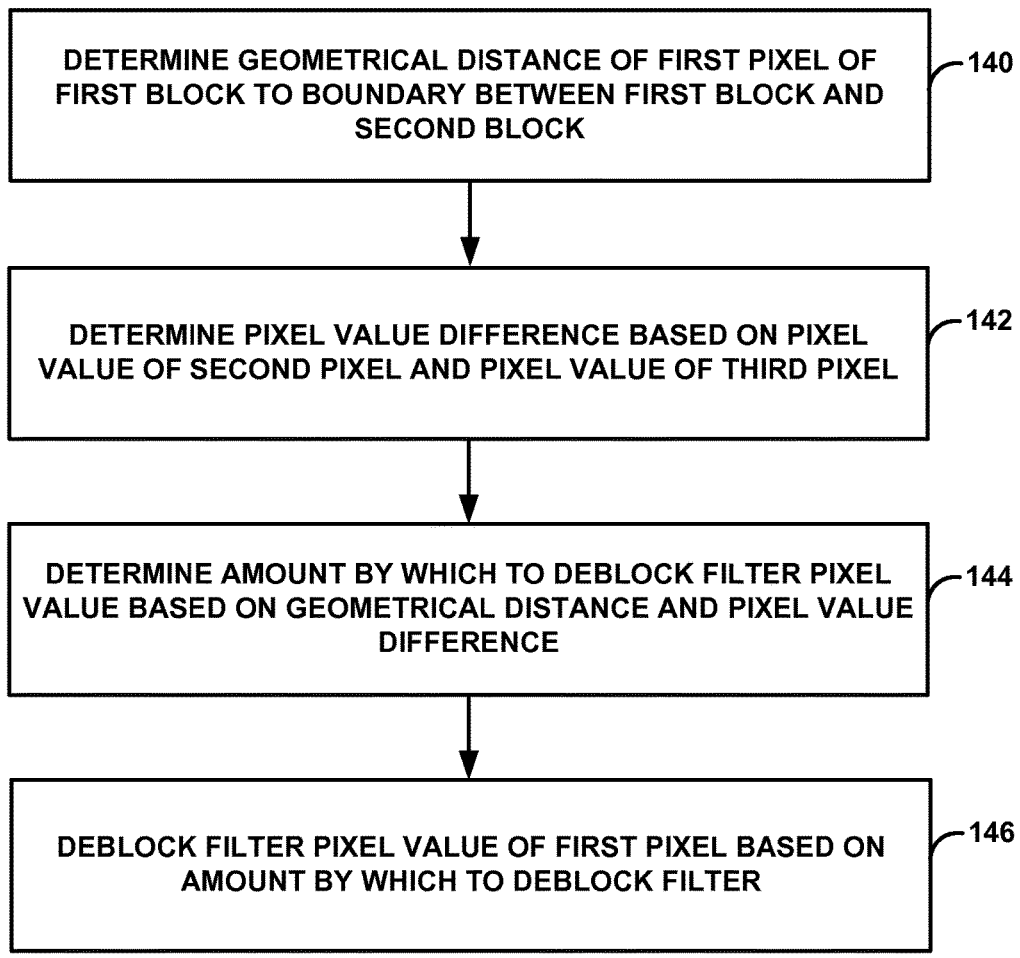
FIG. 7 is a flowchart illustrating an example technique of processing video data.

FIG. 7 is a flowchart illustrating an example technique of processing video data. For purposes of illustration, the example of FIG. 7 is described in detail with respect to FIG. 6. For instance, for ease of description, FIG. 7 is described with pixel $p4_3$ being a pixel that is to be deblock filtered. Also, the example of FIG. 7 is described with a video coder performing the techniques. The video coder is used to generically describe video encoder 20 or video decoder 30.

The video coder may determine a geometrical distance from a first pixel of a first block to a boundary between the first block and a second block (140). For example, the video coder may determine a geometrical distance of pixel $p4_3$ of block 130 to boundary 134, where boundary 134 is the boundary between block 130 and block 132. As one example, the video coder may determine the geometrical distance based on a number of pixels between the first pixel and the boundary. For instance, the geometrical distance of pixel $p4_3$ is 4 based on the equation that n(i)=i, or 9/2 based on the equation that n(i)=(2i+1)/2.

The video coder may determine a pixel value difference based on a pixel value of a second pixel and a pixel value of a third pixel (142). For instance, the video coder may determine a difference between the pixel value of the second pixel and the first pixel value of the third pixel, and divide a result of the difference by two.

In some examples, the second pixel is a pixel of the first block that is closest to the boundary (e.g., $p0_3$ of block 130 is closest to boundary 134), and the third pixel is a pixel of the second block that is closest to the boundary (e.g., $q0_3$ of block 132 is closest to boundary 134). In some examples, the second pixel and the first pixel are the same, and the third pixel is a pixel in the second block that is equidistant to the boundary as the first pixel in the first block (e.g., $q4_3$ is equidistant to boundary 134 as $p4_3$ to boundary 134). As another example, the second pixel and the first pixel are the same, and the third pixel is a pixel that is closets to the boundary (e.g., $q0_3$ is the closest to boundary 134). In some examples, the second and third pixels are neighboring pixels (e.g., $p5_3$ and $p3_3$).

The video coder may determine an amount by which to deblock filter the pixel value of the first pixel based on the geometrical distance and the pixel value difference (144). The video coder may determine a pixel value difference using one or more of the example techniques described above, and determine a weighting for at least the pixel value difference. In these examples, the video coder may determine the amount by which to deblock filter based on the geometrical distance, the pixel value difference, and the weighting for the pixel value difference. In some examples, the video coder may determine the amount by which to deblock filter based on the geometrical distance, the pixel value difference, and a number of pixels that are to be deblock filtered (the number of pixels may be signaled in the bitstream or pre-stored).

The video coder may deblock filter the pixel value of the first pixel based on the amount by which to deblock filter (146). In some cases, the video coder may determine that the amount by which to deblock filter is greater than a first threshold value or less than a second threshold value, and determine an adjusted amount by which to deblock filter based on the amount by which to deblock filter being greater than the first threshold value or less than the second threshold value. The video coder may deblock filter the pixel value based on the adjusted amount by which to deblock filter.

Moreover, in some examples, the video coder may determine whether to deblock filter using the techniques described in this disclosure. For example, the video coder may determine a gradient value for a portion of the first block, where the gradient value is indicative of a smoothness of the portion of the first block. Examples of the portion include a region of the block that includes additional pixels than those that are to be deblock filtered, a line of the block, or even a pixel of the block. The video coder may deblock filter the pixel value based on the gradient value being less than or equal to a threshold gradient value.

As another example, the video coder may determine a first block size of a first transform block used to generate the first block and a second block size of a second transform block used to generate the second block. The video coder may deblock filter the pixel value based on a larger of the first block size and the second block size being equal to a maximum allowable transform block size, or a smaller of the first block size and the second block size being greater than a threshold block size.

In some examples, the video coder may utilize the deblock filtered pixel value as part of inter-prediction or intra-prediction of a subsequent block (e.g., a third block). In examples where the video coder is video encoder 20, video encoder 20 may determine a difference between a pixel value of a pixel in a third block and the deblock filtered pixel value (e.g., as part of inter-prediction or intra-prediction encoding the third block). Video encoder 20 may signal information indicative of the difference between the pixel value of the pixel in the third block and the deblock filtered pixel value, where the signaled information is used for decoding the third block.

If the video coder is video decoder 30, video decoder 30 may receive information indicative of a difference between a pixel value of a pixel in a third block and the deblock filtered pixel value. Video decoder 30 may inter-prediction or intra-prediction decode the third block based on the received information.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

It is to be recognized that depending on the example, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the methods, systems, and apparatuses disclosed herein may be implemented as electronic hardware, computer software executed by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Moreover, examples disclosed herein may be implemented or performed with an electronic device or circuit such as a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A method of processing video data, the method comprising:
   determining a geometrical distance from a first pixel of a first block to a boundary between the first block and a second block, wherein the geometrical distance is based on a number of pixels between the first pixel and the boundary;
   determining a pixel value difference based on a pixel value of a second pixel and a pixel value of a third pixel;
   determining an amount by which to deblock filter a pixel value of the first pixel based on the geometrical distance and the pixel value difference; and
   deblock filtering the pixel value of the first pixel based on the amount by which to deblock filter.

2. The method of claim 1, wherein determining the pixel value difference comprises determining a difference between the pixel value of the second pixel and the pixel value of the third pixel, and dividing the difference by two.

3. The method of claim 1, wherein the second pixel comprises a pixel of the first block that is closest to the boundary, and wherein the third pixel comprises a pixel of the second block that is closest to the boundary.

4. The method of claim 1, wherein the second pixel and the first pixel are the same pixel, and wherein the third pixel comprises a pixel in the second block that is equidistant to the boundary as the first pixel in the first block.

5. The method of claim 1, wherein the second pixel and the first pixel are the same pixel, and wherein the third pixel comprises a pixel in the second block that is closest to the boundary.

6. The method of claim 1, wherein the second pixel comprises a first neighboring pixel of the first pixel, and the third pixel comprises a second neighboring pixel of the first pixel.

7. The method of claim 1, further comprising:
   determining a weighting for at least the pixel value difference,
   wherein determining the amount by which to deblock filter comprises determining the amount by which to deblock filter based on the geometrical distance, the pixel value difference, and the weighting for the pixel value difference.

8. The method of claim 1, further comprising:
determining that the amount by which to deblock filter is greater than a first threshold value or less than a second threshold value; and
determining an adjusted amount by which to deblock filter based on the amount by which to deblock filter being greater than the first threshold value or less than the second threshold value,
wherein deblock filtering the pixel value comprises deblock filtering the pixel value of the first pixel based on the adjusted amount by which to deblock filter.

9. The method of claim 1, wherein determining the amount by which to deblock filter comprises determining the amount by which to deblock filter based on the geometrical distance, the pixel value difference, and a number of pixels that are to be deblock filtered.

10. The method of claim 1, further comprising:
determining a gradient value for a portion of the first block, wherein the gradient value is indicative of a smoothness of the portion of the first block,
wherein deblock filtering comprises deblock filtering the pixel values based on the gradient value being less than or equal to a threshold gradient value.

11. The method of claim 1, further comprising:
determining a first block size of a first transform block used to generate the first block and a second block size of a second transform block used to generate the second block,
wherein deblock filtering comprises deblock filtering the pixel value based on a larger of the first block size and the second block size being equal to a maximum allowable transform block size, or a smaller of the first block size and the second block size being greater than a threshold block size.

12. The method of claim 1, further comprising:
determining a difference between a pixel value of a pixel in a third block and the deblock filtered pixel value; and
signaling information indicative of the difference between the pixel value of the pixel in the third block and the deblock filtered pixel value, wherein the signaled information is used for decoding the third block.

13. The method of claim 1, further comprising:
receiving information indicative of a difference between a pixel value of a pixel in a third block and the deblock filtered pixel value; and
inter-prediction or intra-prediction decoding the third block based on the received information.

14. A device for processing video data, the device comprising:
a video data memory storing pixel values; and
a video coder comprising processing circuitry, wherein the video coder is configured to:
determine a geometrical distance from a first pixel of a first block to a boundary between the first block and a second block, wherein pixel values of the second block are stored in the video data memory, and wherein the geometrical distance is based on a number of pixels between the first pixel and the boundary;
determine a pixel value difference based on a pixel value of a second pixel and a pixel value of a third pixel;
determine an amount by which to deblock filter a pixel value of the first pixel based on the geometrical distance and the pixel value difference; and
deblock filter the pixel value of the first pixel based on the amount by which to deblock filter.

15. The device of claim 14, wherein to determine the pixel value difference, the video coder is configured to determine a difference between the pixel value of the second pixel and the pixel value of the third pixel, and divide the difference by two.

16. The device of claim 14, wherein the second pixel comprises a pixel of the first block that is closest to the boundary, and wherein the third pixel comprises a pixel of the second block that is closest to the boundary.

17. The device of claim 14, wherein the second pixel and the first pixel are the same pixel, and wherein the third pixel comprises a pixel in the second block that is equidistant to the boundary as the first pixel in the first block.

18. The device of claim 14, wherein the second pixel and the first pixel are the same pixel, and wherein the third pixel comprises a pixel in the second block that is closest to the boundary.

19. The device of claim 14, wherein the second pixel comprises a first neighboring pixel of the first pixel, and the third pixel comprises a second neighboring pixel of the first pixel.

20. The device of claim 14, wherein the video coder is configured to:
determine a weighting for at least the pixel value difference,
wherein to determine the amount by which to deblock filter, the video coder is configured to determine the amount by which to deblock filter based on the geometrical distance, the pixel value difference, and the weighting for the pixel value difference.

21. The device of claim 14, wherein the video coder is configured to:
determine that the amount by which to deblock filter is greater than a first threshold value or less than a second threshold value; and
determine an adjusted amount by which to deblock filter based on the amount by which to deblock filter being greater than the first threshold value or less than the second threshold value,
wherein to deblock filter the pixel value, the video coder is configured to deblock filter the pixel value of the first pixel based on the adjusted amount by which to deblock filter.

22. The device of claim 14, wherein to determine the amount by which to deblock filter, the video coder is configured to determine the amount by which to deblock filter based on the geometrical distance, the pixel value difference, and a number of pixels that are to be deblock filtered.

23. The device of claim 14, wherein the video coder is configured to:
determine a gradient value for a portion of the first block, wherein the gradient value is indicative of a smoothness of the portion of the first block,
wherein to deblock filter, the video coder is configured to deblock filter the pixel values based on the gradient value being less than or equal to a threshold gradient value.

24. The device of claim 14, wherein the video coder is configured to:

determine a first block size of a first transform block used to generate the first block and a second block size of a second transform block used to generate the second block, wherein to deblock filter, the video coder is configured to deblock filter the pixel value based on a larger of the first block size and the second block size being equal to a maximum allowable transform block size, or a smaller of the first block size and the second block size being greater than a threshold block size.

25. The device of claim 14, wherein the device comprises one of:

a microprocessor;

an integrated circuit (IC); or a wireless handset device.

26. A device for processing video data, the device comprising:

means for determining a geometrical distance from a first pixel of a first block to a boundary between the first block and a second block, wherein the geometrical distance is based on a number of pixels between the first pixel and the boundary;

means for determining a pixel value difference based on a pixel value of a second pixel and a pixel value of a third pixel;

means for determining an amount by which to deblock filter a pixel value of the first pixel based on the geometrical distance and the pixel value difference; and means for deblock filtering the pixel value of the first pixel based on the amount by which to deblock filter.

27. A non-transitory computer-readable storage medium having instructions stored thereon that when executed cause one or more processors of a device for processing to:

determine a geometrical distance from a first pixel of a first block to a boundary between the first block and a second block, wherein the geometrical distance is based on a number of pixels between the first pixel and the boundary;

determine a pixel value difference based on a pixel value of a second pixel and a pixel value of a third pixel;

determine an amount by which to deblock filter a pixel value of the first pixel based on the geometrical distance and the pixel value difference; and deblock filter the pixel value of the first pixel based on the amount by which to deblock filter.

* * * * *